US008516291B2

(12) United States Patent
Nakayama et al.

(10) Patent No.: US 8,516,291 B2
(45) Date of Patent: Aug. 20, 2013

(54) INFORMATION PROCESSING APPARATUS, DATA RECEPTION DEVICE AND METHOD OF CONTROLLING THE INFORMATION PROCESSING APPARATUS

(75) Inventors: Hiroshi Nakayama, Kawasaki (JP); Junji Ichimiya, Kawasaki (JP); Shintaro Itozawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 183 days.

(21) Appl. No.: 12/955,473

(22) Filed: Nov. 29, 2010

(65) Prior Publication Data

US 2011/0072296 A1    Mar. 24, 2011

(51) Int. Cl.
G06F 1/12 (2006.01)

(52) U.S. Cl.
USPC ............ 713/400; 713/401; 713/500; 713/503

(58) Field of Classification Search
USPC .................. 713/400, 401, 500, 501, 502, 503
See application file for complete search history.

(56) References Cited

U.S. PATENT DOCUMENTS

| 5,794,020 | A | 8/1998 | Tanaka et al. | |
|---|---|---|---|---|
| 5,867,541 | A | 2/1999 | Tanaka et al. | |
| 6,198,689 | B1 | 3/2001 | Yamazaki et al. | |
| 6,654,897 | B1 | 11/2003 | Dreps et al. | |
| 2004/0068682 | A1 | 4/2004 | Takei et al. | |
| 2005/0114724 | A1* | 5/2005 | Wu ............................. | 713/401 |
| 2006/0036915 | A1 | 2/2006 | Takei et al. | |
| 2006/0184844 | A1 | 8/2006 | Sakamaki | |
| 2007/0176658 | A1 | 8/2007 | Ishikawa | |

FOREIGN PATENT DOCUMENTS

| JP | 05-145537 | 6/1993 |
|---|---|---|
| JP | 7-311735 | 11/1995 |
| JP | 9-8796 | 1/1997 |
| JP | 11-3135 | 1/1999 |
| JP | 11-88309 | 3/1999 |
| JP | 2000-151567 | 5/2000 |
| JP | 2000-163963 | 6/2000 |
| JP | 2000-187642 | 7/2000 |
| JP | 2000-244469 | 9/2000 |
| JP | 2002-539526 | 11/2002 |
| JP | 2004-127147 | 4/2004 |
| JP | 2004-531117 | 10/2004 |
| JP | 2006-209638 | 8/2006 |
| JP | 2007-202033 | 8/2007 |
| WO | 00/54164 | 9/2000 |
| WO | WO 02/069552 | 9/2002 |

OTHER PUBLICATIONS

International Search Report mailed Sep. 9, 2008 in corresponding International Application PCT/JP2008/001405.
Extended European Search Report dated Mar. 27, 2012 issued in corresponding European Patent Application No. 08764002.5.
Japanese Office Action issued Jun. 26, 2012 in corresponding Japanese Patent Application No. 2010-515668.

* cited by examiner

Primary Examiner — Paul Yanchus, III
(74) Attorney, Agent, or Firm — Staas & Halsey LLP

(57) ABSTRACT

A clock adjustment circuit delays a phase of a clock signal on the basis of a TAP value so as to output an adjusted clock signal. By synchronizing transmission data with the adjusted clock signal, reception data is generated. A data adjustment circuit delays the transmission data on the basis of a TAP2 value. By synchronizing the delayed transmission data with the adjusted clock signal, adjusted reception data is generated. A data adjustment control circuit generates the TAP2 value on the basis of a result of a comparison between the reception data and the adjusted reception data, and outputs to a clock adjustment control circuit an instruction to update the TAP value.

9 Claims, 24 Drawing Sheets

| TAP VALUE j [2:0] | SWITCH (0:OFF, 1:ON) | | | | | | | DELAY AMOUNT |
|---|---|---|---|---|---|---|---|---|
| | sw0 | sw1 | sw2 | sw3 | sw4 | sw5 | sw6 | SMALL → LARGE |
| 0 | 0 | 0 | 0 | 0 | 0 | 0 | 0 | |
| 1 | 1 | 0 | 0 | 0 | 0 | 0 | 0 | |
| 2 | 1 | 1 | 0 | 0 | 0 | 0 | 0 | |
| 3 | 1 | 1 | 1 | 0 | 0 | 0 | 0 | |
| 4 | 1 | 1 | 1 | 1 | 0 | 0 | 0 | |
| 5 | 1 | 1 | 1 | 1 | 1 | 0 | 0 | |
| 6 | 1 | 1 | 1 | 1 | 1 | 1 | 0 | |
| 7 | 1 | 1 | 1 | 1 | 1 | 1 | 1 | |

FIG. 6

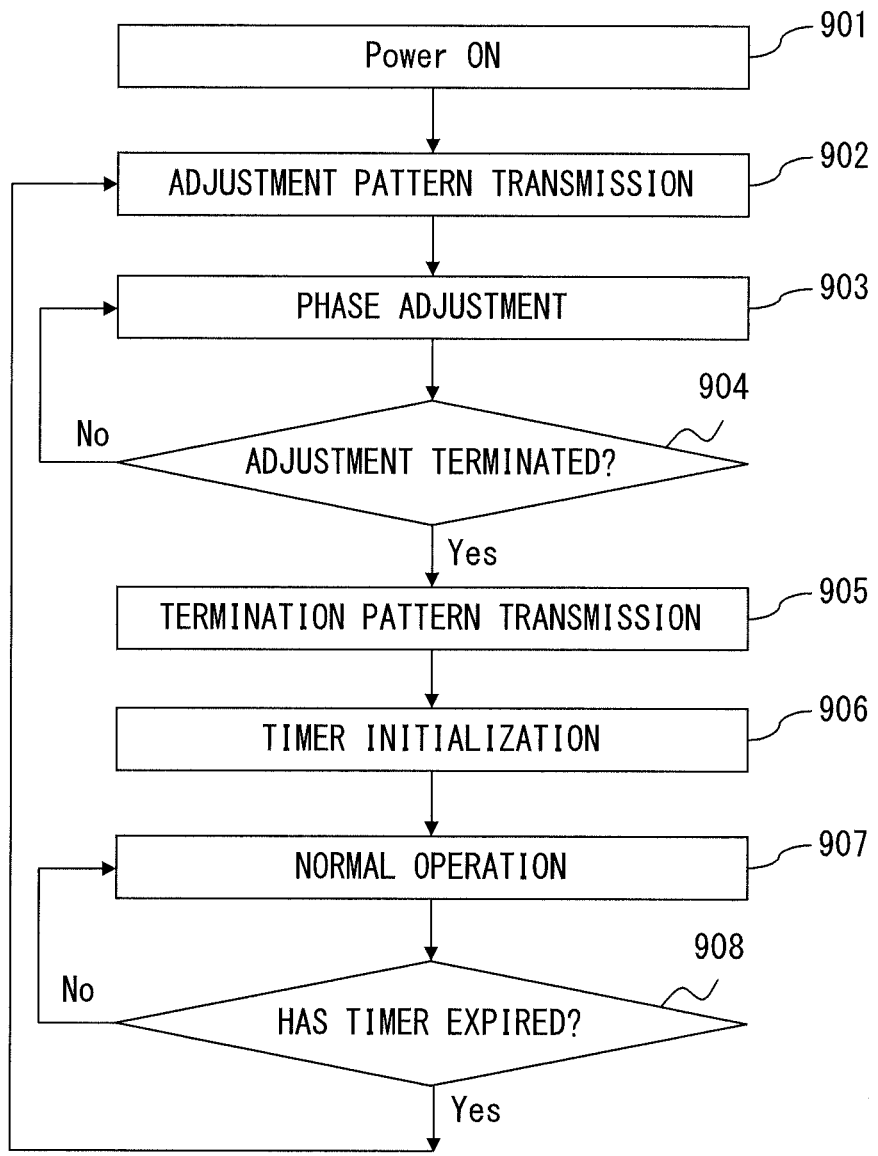
F I G. 9

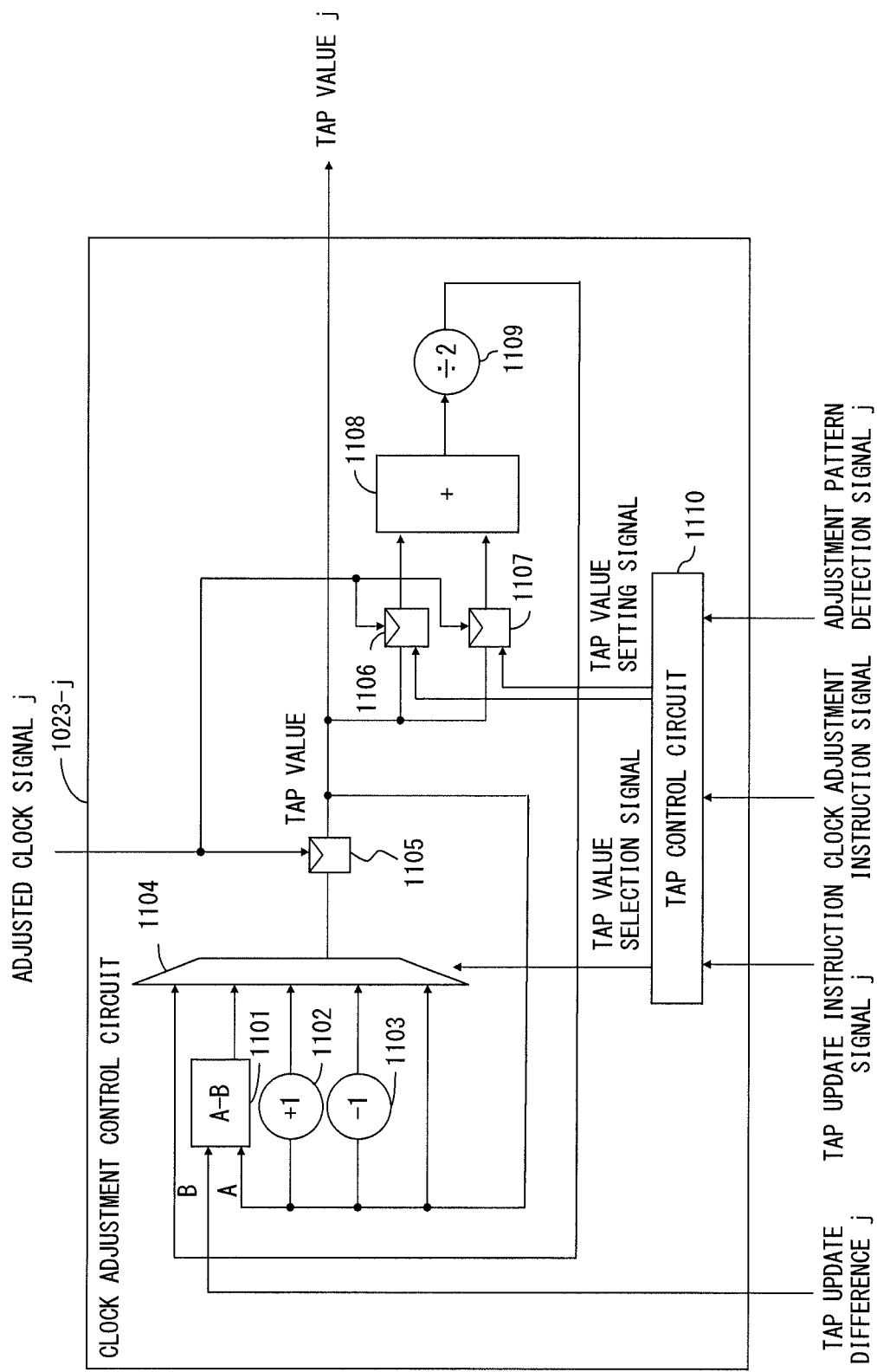
F I G. 12

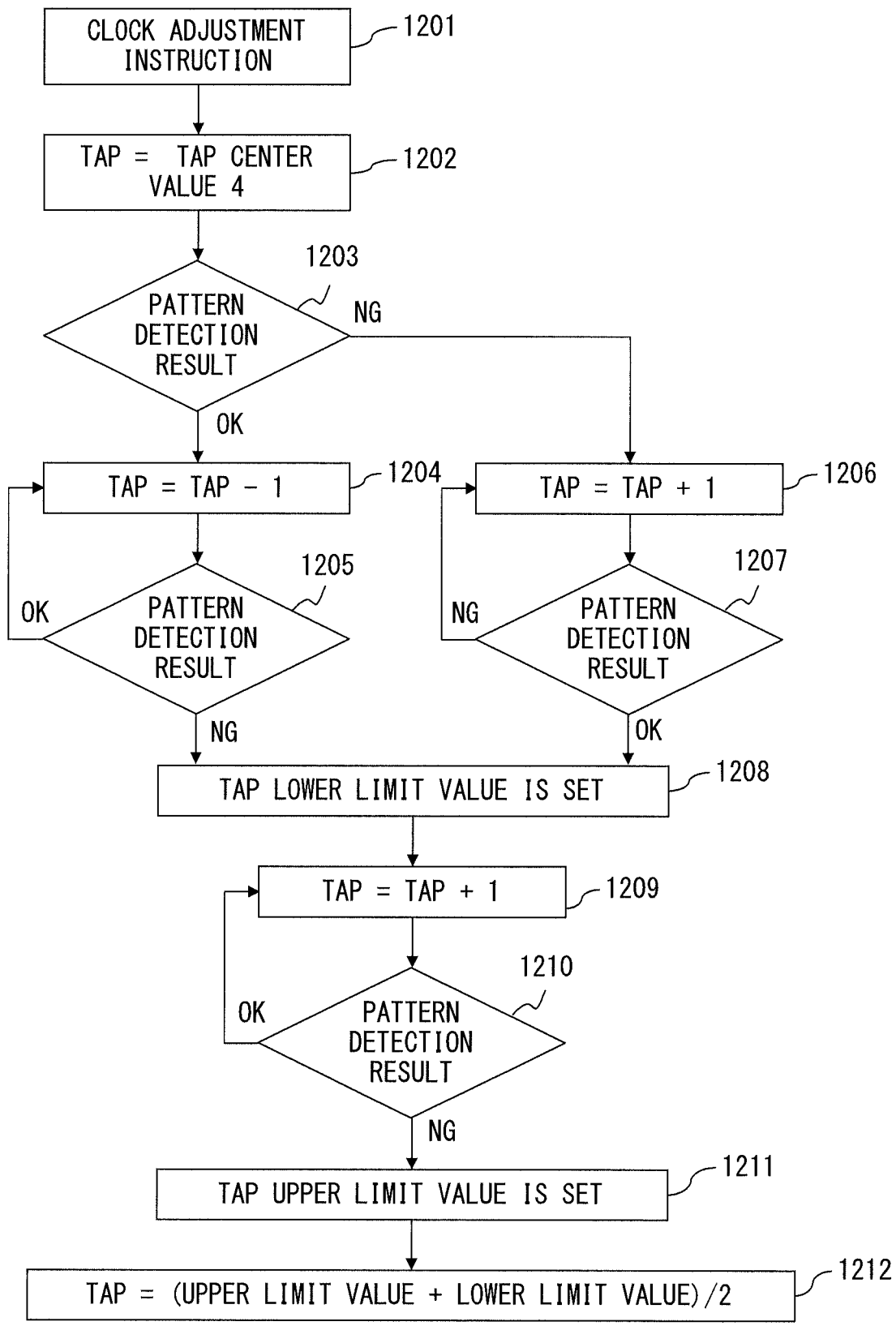
F I G. 1 3

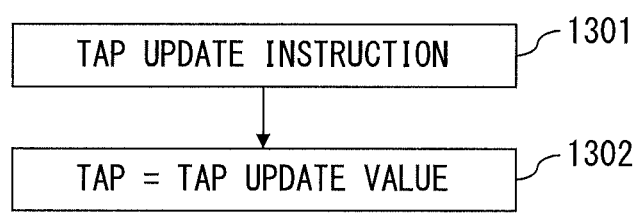
F I G. 1 4

| TAP2 VALUE j [3:0] | SWITCH (0:OFF, 1:ON) | | | | | | | | | | | | | | | DELAY AMOUNT |
|---|---|---|---|---|---|---|---|---|---|---|---|---|---|---|---|---|
| | sw0 | sw1 | sw2 | sw3 | sw4 | sw5 | sw6 | sw7 | sw8 | sw9 | sw10 | sw11 | sw12 | sw13 | sw14 | SMALL → LARGE |
| −8 | 0 | 0 | 0 | 0 | 0 | 0 | 0 | 0 | 0 | 0 | 0 | 0 | 0 | 0 | 0 | |
| −7 | 1 | 0 | 0 | 0 | 0 | 0 | 0 | 0 | 0 | 0 | 0 | 0 | 0 | 0 | 0 | |
| −6 | 1 | 1 | 0 | 0 | 0 | 0 | 0 | 0 | 0 | 0 | 0 | 0 | 0 | 0 | 0 | |
| −5 | 1 | 1 | 1 | 0 | 0 | 0 | 0 | 0 | 0 | 0 | 0 | 0 | 0 | 0 | 0 | |
| −4 | 1 | 1 | 1 | 1 | 0 | 0 | 0 | 0 | 0 | 0 | 0 | 0 | 0 | 0 | 0 | |
| −3 | 1 | 1 | 1 | 1 | 1 | 0 | 0 | 0 | 0 | 0 | 0 | 0 | 0 | 0 | 0 | |
| −2 | 1 | 1 | 1 | 1 | 1 | 1 | 0 | 0 | 0 | 0 | 0 | 0 | 0 | 0 | 0 | |
| −1 | 1 | 1 | 1 | 1 | 1 | 1 | 1 | 0 | 0 | 0 | 0 | 0 | 0 | 0 | 0 | |
| 0 | 1 | 1 | 1 | 1 | 1 | 1 | 1 | 1 | 0 | 0 | 0 | 0 | 0 | 0 | 0 | |
| 1 | 1 | 1 | 1 | 1 | 1 | 1 | 1 | 1 | 1 | 0 | 0 | 0 | 0 | 0 | 0 | |
| 2 | 1 | 1 | 1 | 1 | 1 | 1 | 1 | 1 | 1 | 1 | 0 | 0 | 0 | 0 | 0 | |
| 3 | 1 | 1 | 1 | 1 | 1 | 1 | 1 | 1 | 1 | 1 | 1 | 0 | 0 | 0 | 0 | |
| 4 | 1 | 1 | 1 | 1 | 1 | 1 | 1 | 1 | 1 | 1 | 1 | 1 | 0 | 0 | 0 | |
| 5 | 1 | 1 | 1 | 1 | 1 | 1 | 1 | 1 | 1 | 1 | 1 | 1 | 1 | 0 | 0 | |
| 6 | 1 | 1 | 1 | 1 | 1 | 1 | 1 | 1 | 1 | 1 | 1 | 1 | 1 | 1 | 0 | |
| 7 | 1 | 1 | 1 | 1 | 1 | 1 | 1 | 1 | 1 | 1 | 1 | 1 | 1 | 1 | 1 | |

FIG. 16

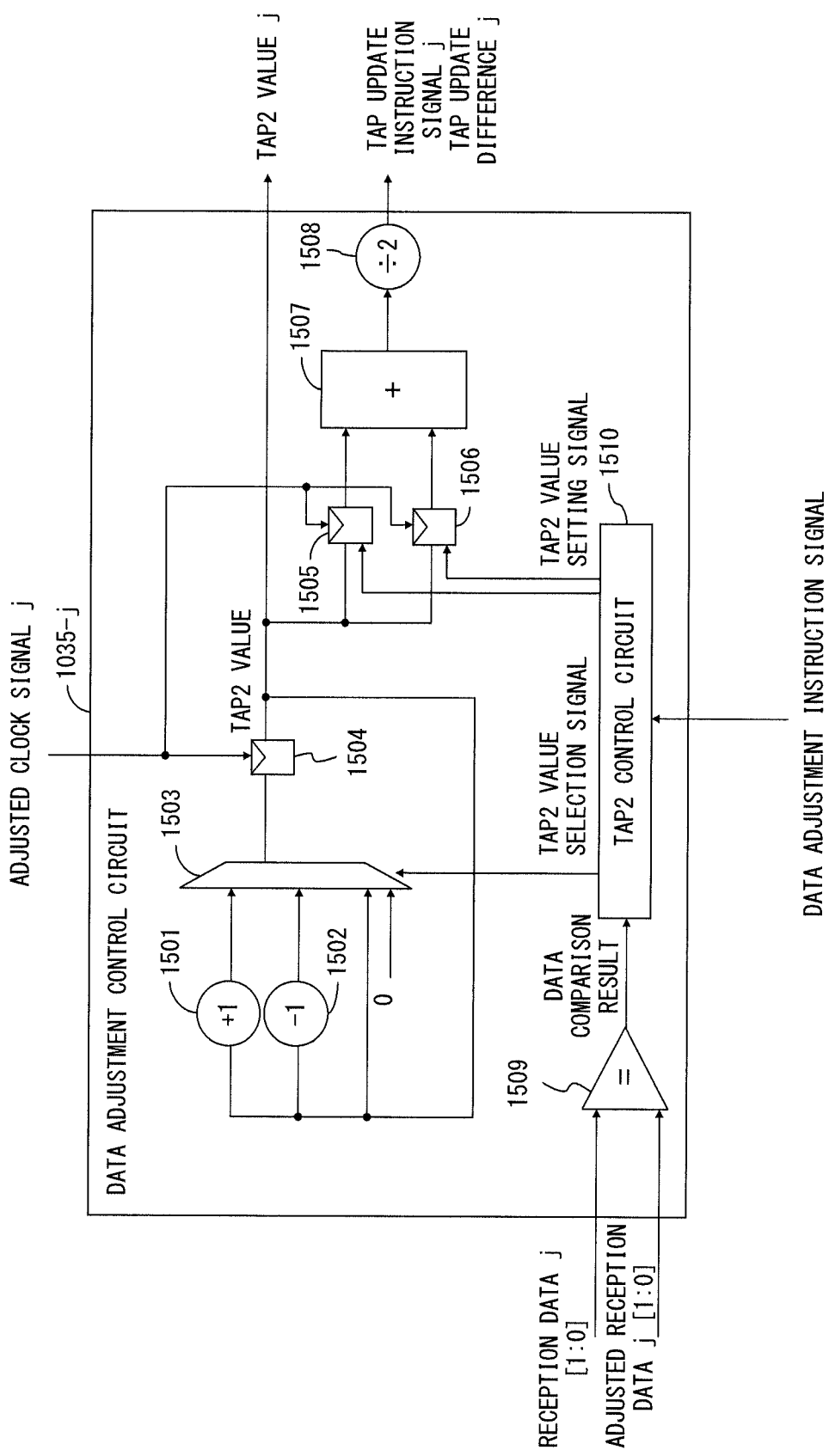
F I G. 17

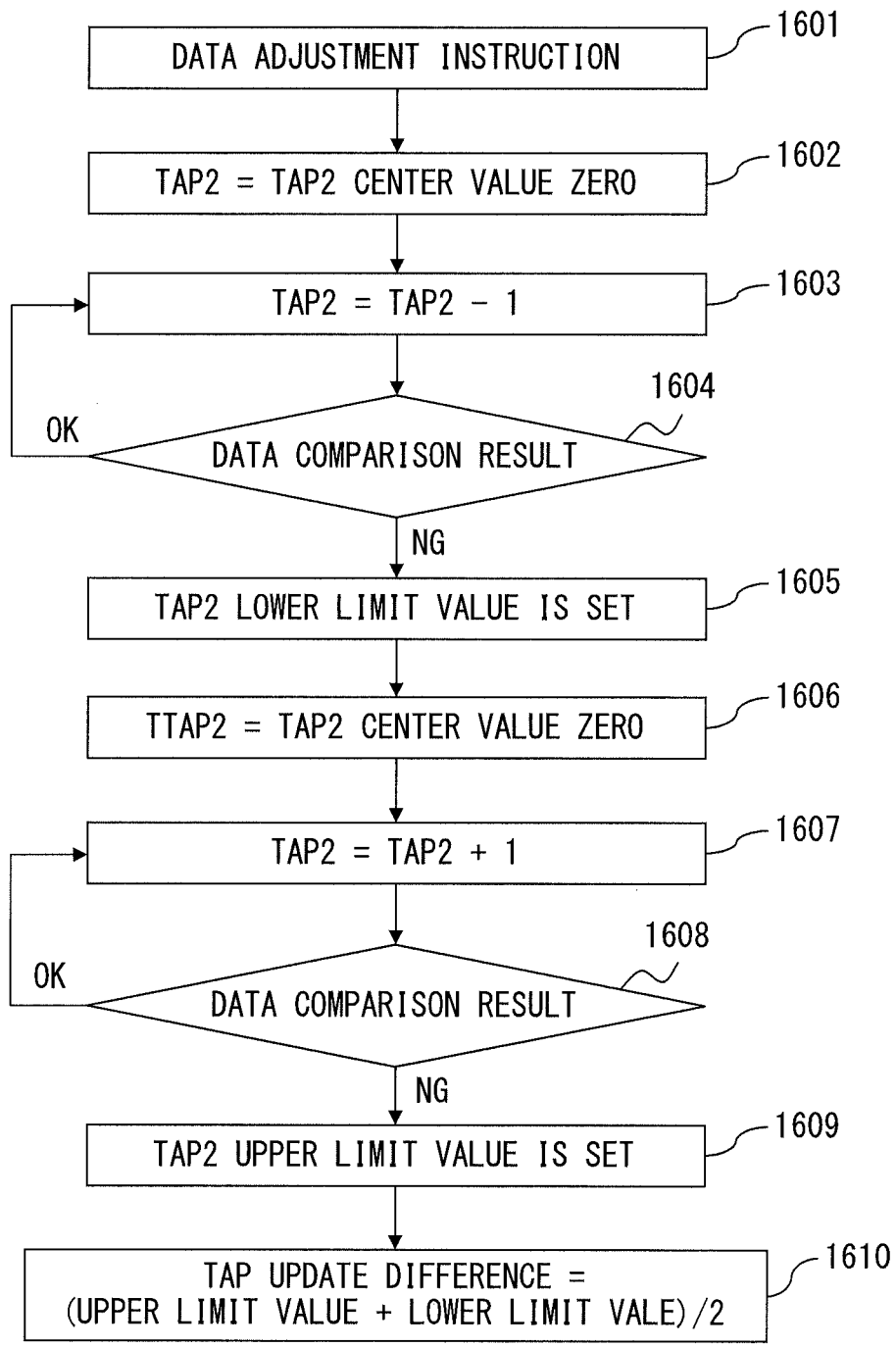
F I G. 1 8

INFORMATION PROCESSING APPARATUS, DATA RECEPTION DEVICE AND METHOD OF CONTROLLING THE INFORMATION PROCESSING APPARATUS

CROSS-REFERENCE TO RELATED APPLICATIONS

This application is a continuation application of International PCT Application No. PCT/JP2008/001405 which was filed on Jun. 3, 2008.

FIELD

The present invention is related to an information processing apparatus, a data reception device, and a method of controlling the information processing apparatus.

BACKGROUND

FIG. 1 illustrates an example of a configuration of a computer system. This computer system includes system boards (SBs) #0 through #7, input/output units (IOUs) #0 through #7, memory-system interconnection boards 101, and a management board 102.

Each SB #i (i=0 through 7) includes memories 111, central processing units (CPUs) 112, and a chip set 113. Each IOU #i (i=0 through 7) includes a PCI (Peripheral Components Interconnect) cards 131, hard disk devices 132, and a chip set 133.

Each of the memory-system interconnection boards 101 includes a chip set 121, and connects SBs #0 through #7 and IOUs #0 through #7 to each other. The management board 102 includes a controller 141 connected to the respective chip sets 113, 133, and 121, and controls the system. The controller 141 is implemented in the form of, for example, firmware.

The chip sets 113, 133, and 121 are control LSIs (Large Scale Integration). The chip set 113 includes a transmission/reception unit 114, the chip set 121 includes transmission/reception units 122 and 123, and the chip set 133 includes a transmission/reception unit 134. These chip sets are connected to each other via the transmission/reception units, and data is transmitted and received between the chip sets.

FIGS. 2A and 2B illustrate examples of configurations of a transmission chip and a reception chip according to a conventional technique. A transmission chip 201 corresponds to the transmission/reception units on the transmission side, and a reception chip 202 corresponds to the transmission/reception units on the reception side. The transmission chip 201 and the reception chip 202 are connected through a clock signal line and N (N is a positive integer) data signal lines.

The transmission chip 201 includes a phase-locked loop circuit (PLL) 211, a clock output circuit 212, a pattern generation circuit 213, data selection circuits 214-1 through 214-N, flip-flop circuits 215-1 through 215-N and 216-1 through 216-N, bit selection circuits 217-1 through 217-N, data output circuits 218-1 through 218-N, and a transmission-unit control circuit 219.

The transmission-unit control circuit 219 outputs a pattern selection signal to the pattern generation circuit 213 in accordance with a training-starting instruction signal from a controller 141, and outputs a data selection signal to the data selection circuits 214-1 through 214-N.

The PLL 211 generates a clock signal, and outputs the clock signal to the clock output circuit 212, the flip-flop circuits 215-1 through 215-N and 216-1 through 216-N, and the bit selection circuits 217-1 through 217-N. The clock output circuit 212 outputs the clock signal to the reception chip 202.

The pattern generation circuit 213 generates a 2-bit training pattern [1:0] in accordance with the pattern selection signal, and outputs the pattern to the data selection circuits 214-1 through 214-N. A training pattern [1:0] is a data string that is predetermined among the chips, and is used when phases are adjusted.

Each data selection circuit 214-$j$ (j=1 through N) selects either 2-bit transmission data [1:0] or a training pattern [1:0] in accordance with the data selection signal, and outputs the values of bit 0 and bit 1 of the selected signal to the flip-flop circuits 215-$j$ and 216-$j$, respectively.

Each flip-flop circuit 215-$j$ latches the value of bit zero in synchronization with the clock signal, and outputs the value to the bit selection circuit 217-$j$. Each flip-flop circuit 216-$j$ latches the value of bit 1 in synchronization with the clock signal, and outputs the value to the bit selection circuit 217-$j$.

Each bit selection circuit 217-$j$ selects an output signal from either the flip-flop circuit 215-$j$ or 216-$j$ in accordance with the value of the clock signal, and outputs the signal to the data output circuit 218-$j$. In this example, when the logic of the clock signal is "1", the signal output from the flip-flop circuit 215-$j$ is selected, and when the logic of the clock signal is "0", the signal output from the flip-flop circuit 216-$j$ is selected. Each data output circuit 218-$j$ outputs a signal output from the bit selection circuit 217-$j$ to the reception chip 202 as a data signal.

The reception chip 202 includes a clock input circuit 221, clock adjustment circuits 222-1 through 222-N, clock adjustment control circuits 223-1 through 223-N, pattern detection circuits 224-1 through 224-N, data input circuits 225-1 through 225-N, flip-flop circuits 226-1 through 226-N, 227-1 through 227-N, and 228-1 through 228-N, and a reception-unit control circuit 229.

The reception-unit control circuit 229 outputs a clock adjustment instruction signal to the clock adjustment control circuits 223-1 through 223-N in accordance with the training-starting instruction signal from the controller 141.

A clock signal output from the transmission chip 201 is input to the clock input circuit 221, and the clock input circuit 221 outputs the input clock signal to the clock adjustment circuits 222-1 through 222-N.

Each clock adjustment circuit 222-$j$ delays the phase of the clock signal in accordance with the TAP value j from the clock adjustment control circuit 223-$j$, generates the adjusted clock signal j, and outputs the adjusted clock signal j to the clock adjustment control circuit 223-$j$ and the flip-flop circuits 226-$j$, 227-$j$, and 228-$j$.

The data signal output from the data output circuit 218-$j$ in the transmission chip 201 is input to the data input circuit 225-$j$, and the data input circuit 225-$j$ outputs the input data signal to the flip-flop circuits 226-$j$ and 228-$j$.

The flip-flop circuit 226-$j$ latches the data signal in synchronization with the inversion signal of the adjusted clock signal j, and outputs the signal to the flip-flop circuit 227-$j$. The flip-flop circuit 227-$j$ latches the output signal of the flip-flop circuit 226-$j$ in synchronization with the adjusted clock signal j, and outputs the signal as the value of bit 0 of reception data. The flip-flop circuit 228-$j$ latches the data signal in synchronization with the adjusted clock signal j, and outputs the signal as the value of bit 1 of the reception data. In this manner, 2-bit reception data j [1:0] is generated.

The pattern detection circuit 224-$j$ detects the pattern of reception data j [1:0], and outputs an adjustment pattern detection signal j to the clock adjustment control circuit 223-$j$, and outputs a termination pattern detection signal j to the reception-unit control circuit 229.

Each clock adjustment control circuit 223-j starts phase adjustment in accordance with the clock adjustment instruction signal, and increases or decreases the TAP value j in accordance with an adjustment pattern detection signal j from the pattern detection circuit 224-j. Then, the clock adjustment control circuit 223-j outputs the TAP value j to the clock adjustment circuit 222-j In data transmission between chips, clock signals need to be input to the flip-flop circuits 226-j, 227-j, and 228-j with the edges of the clock signals being made to correspond to the centers of the data waveform in order to secure a margin. Accordingly, phase adjustment of clock signals is usually performed by using a known training pattern [1:0]. When the phase adjustment is performed, the transmission chip 201 selects and outputs a training pattern [1:0]. The reception chip 202 receives a training pattern [1:0] while changing the TAP value j, and calculates the TAP value that corresponds to the center of the data waveform in accordance with the pattern detection result.

FIG. 3 illustrates an example of a configuration of the pattern generation circuit 213 illustrated in FIG. 2A. The pattern generation circuit 213 includes an adjustment pattern storage unit 301, a termination pattern storage unit 302, and a pattern selection circuit 303.

The adjustment pattern storage unit 301 stores 2-bit adjustment pattern "10", and outputs the adjustment pattern to the pattern selection circuit 303. The termination pattern storage unit 302 stores 2-bit termination pattern "11", and outputs the termination pattern to the pattern selection circuit 303. The pattern selection circuit 303 selects a pattern in accordance with a pattern selection signal from the transmission-unit control circuit 219, and outputs the selected pattern as a training pattern [1:0].

FIG. 4 illustrates an example of a configuration of the pattern detection circuit 224-j illustrated in FIGS. 2A and 2B. The pattern detection circuit 224-j includes an adjustment pattern storage unit 401, a termination pattern storage unit 402, and comparators 403 and 404.

The adjustment pattern storage unit 401 stores adjustment pattern "10" and outputs the adjustment pattern to the comparator 403. The termination pattern storage unit 302 stores termination pattern "11", and outputs the termination pattern to the comparator 404.

The comparator 403 compares the reception data j [1:0] and adjustment pattern "10", and when they correspond to each other, the comparator 403 outputs an adjustment pattern detection signal j (for example, logic "1") indicating that the pattern detection result is OK. When they do not correspond, an adjustment pattern detection signal (for example, logic "0") indicating that the pattern detection result is NG is output.

The comparator 404 compares the reception data j [1:0] and termination pattern "10", and when they correspond to each other, the comparator 404 outputs a termination pattern detection signal j (for example, logic "1") indicating that the pattern detection result is OK. When they do not correspond, a termination pattern detection signal (for example, logic "0") indicating that the pattern detection result is NG is output.

FIG. 5 illustrates an example of a configuration of the clock adjustment circuit 222-j illustrated in FIGS. 2A and 2B. The clock adjustment circuit 222-j includes a delay line and a decoder 502. The delay line includes buffer circuits 501-0 through 501-6, switches sw0 through sw6, and capacitors 503-0 through 503-6.

The decoder 502 turns on/off the switches sw0 through sw6 in accordance with the TAP value j from the clock adjustment control circuit 223-j in order to change the load capacity of the delay line. Thereby, the delay amount of the delay line is controlled, and the phases of input clock signals are changed.

FIG. 6 illustrates relationships between TAP values j and switching signals output from the decoder 502 to the switches sw0 through sw6. Switches swk (k=0 through 6) are turned on when an input switching signal has the logic "1", and are turned off when the logic is "0". The more switches there are that are turned on, the greater the load capacity and the delay amount become. By contrast, the more switches there are that are turned off, the smaller the load capacity and the delay amount become. In this example, one of eight stages of delay amount can be set by using 3-bit TAP value j [2:0] that expresses one of 0 through 7.

FIG. 7 illustrates an example of a configuration of the clock adjustment control circuit 223-j illustrated in FIGS. 2A and 2B. The clock adjustment control circuit 223-j includes an incrementer 701, a decrementer 702, a TAP value selection circuit 703, flip-flop circuits 704, 705, and 706, an adder circuit 707, a divider circuit 708, and a TAP control circuit 709.

The TAP control circuit 709 starts phase adjustments in accordance with the clock adjustment signal from the reception-unit control circuit 229. Further, the TAP control circuit 709 outputs a TAP value selection signal to the TAP value selection circuit 703 in accordance with an adjustment pattern detection signal j from the pattern detection circuit 224-j, and outputs the TAP value setting signal to the flip-flop circuits 705 and 706.

The incrementer 701 adds 1 to the TAP value output from the flip-flop circuit 704 to output the resultant value to the TAP value selection circuit 703 while the decrementer 702 subtracts 1 from the TAP value output from the flip-flop circuit 704 to output the resultant value to the TAP value selection circuit 703.

The TAP value selection circuit 703 selects one of the TAP values output from the flip-flop circuit 704, the incrementer 701, the decrementer 702, and the divider circuit 708 in accordance with the TAP value selection signal, and outputs the selected the TAP value to the flip-flop circuit 704.

The flip-flop circuit 704 latches a TAP value output from the TAP value selection circuit 703 in synchronization with the adjusted clock signal j, and outputs the value as a TAP value j. The flip-flop circuit 705 latches the TAP value j in synchronization with the adjusted clock signal j, and outputs the value to the adder circuit 707 as the upper limit value. The flip-flop circuit 706 latches the TAP value j in synchronization with the adjusted clock signal j, and outputs the value to the adder circuit 707 as the lower limit value. Also, the flip-flop circuits 705 and 706 hold the upper and lower limit values in accordance with the respective TAP value setting signals.

The adder circuit 707 adds the upper limit value and the lower limit value output from the flip-flop circuit 705 and the flip-flop circuit 706, respectively, and outputs the addition results to the divider circuit 708. The divider circuit 708 outputs to the TAP value selection circuit 703 a value that is half the addition result.

FIG. 8 is a flowchart for operations of the TAP control circuit 709. The TAP control circuit 709 outputs a TAP value selection signal that selects a TAP center value 4 (step S802) in response to reception of a clock adjustment instruction signal from the reception-unit control circuit 229 (step 801).

Next, a pattern detection result is estimated (step 803) on the basis of the adjustment pattern detection signal j from the pattern detection circuit 224-j (step 803). When the pattern detection result is OK, a TAP value selection signal that selects a lower TAP value is output (step 804). Thereby, a TAP value output from the decrementer 702 is output to the clock adjustment circuit 222-j as a TAP value j.

Next, a pattern detection result is determined on the basis of the adjustment pattern detection signal j (step S805), and the operations in step 804 are repeated when the pattern detection result is OK. When the pattern detection result has become NG, the TAP value setting signal is output to the flip-flop circuit 706 (step 808). Thereby, the current TAP value j is set in the flip-flop circuit 706 as the lower limit value.

When the pattern detection result is NG in step 803, a TAP value selection signal that selects a greater TAP value is output (step 806). Thereby, a TAP value output from the incrementer 701 is output to the clock adjustment circuit 222-j as a TAP value j.

Next, the pattern detection result is determined on the basis of the adjustment pattern detection signal (step 807), and the operations in step 806 are repeated when the pattern detection result is NG. When the pattern detection result has become OK, a TAP value setting signal is output to the flip-flop circuit 706 (step 808).

When the lower limit value is set in step 808, a TAP value selection signal that selects a greater TAP value is output (step 809), and a pattern detection result is determined on the basis of the adjustment pattern detection signal j (step 810). When the pattern detection result is OK, the operations in step 809 are repeated. When the pattern detection result has become NG, a TAP value setting signal is output to the flip-flop circuit 705 (step 811). Thereby, the current TAP value j is set in the flip-flop circuit 705 as the upper limit value.

Next, a TAP value selection signal that selects a TAP optimum value is output (step 812). Thereby, the average value between the upper and lower limit values that have been set is selected, and the selected value is output to the clock adjustment circuit 222-j as the TAP value that corresponds to the center of the data waveform.

FIG. 9 is a flowchart for phase adjustment operations performed by the controller 141, the transmission chip 201, and the reception chip 202 illustrated in FIGS. 2A and 2B. The transmission-unit control circuit 219 and the reception-unit control circuit 229 start a phase adjustment in response to an instruction from the external environment when the system is to be initialized, and starts phase adjustments periodically in accordance with a timer when the system is in operation.

When the power of the computer system is turned on (step 901), the controller 141 outputs a training-starting instruction signal to the transmission-unit control circuit 219 and the reception-unit control circuit 229.

The transmission-unit control circuit 219 outputs to the pattern generation circuit 213 a pattern selection signal that selects an adjustment pattern, and outputs to the data selection circuits 214-1 through 214-N the data selection signal that selects a training pattern [1:0]. Thereby, the adjustment pattern is transferred as a training pattern [1:0] to the reception chip 202 (step 902).

The reception-unit control circuit 229 outputs a clock adjustment instruction signal to the clock adjustment control circuits 223-1 through 223-N. Thereby, the operations in FIG. 8 start, and a phase adjustment of a clock signal is performed (step 903).

When the phase adjustment is terminated (step 904), the transmission-unit control circuit 219 outputs to the pattern generation circuit 213 a pattern selection signal that selects a termination pattern, and initializes the timer. Thereby, the termination pattern is transferred as a training pattern [1:0] to the reception chip 202 (step 905).

The pattern detection circuits 224-1 through 224-N output to the reception-unit control circuit 229 termination pattern detection signals 1 through N, which indicate the termination of the phase adjustments, and the reception-unit control circuit 229 initializes the timer (step 906). Thereby, normal operations using the adjusted clock signals 1 through N are performed until the counting operations of the timers of the transmission-unit control circuit 219 and the reception-unit control circuit 229 expire (step 907).

When the counting operations of the timers of the transmission-unit control circuit 219 and the reception-unit control circuit 229 have expired (step 908), the operations in and subsequent to step 902 are repeated. As described above, the transmission-unit control circuit 219 and the reception-unit control circuit 229 perform the operations of steps 902 through 905 not only at the time of initialization but also during operation so as to readjust the phases of clock signals.

FIGS. 10A and 10B are a timing chart illustrating an example of the phase adjustment operations performed by the reception chip 202 illustrated in FIGS. 2A and 2B. When phases are adjusted, adjustment pattern "10" is repeatedly output from the data output circuit 218-j of the transmission chip 201, and repeated patterns such as "010101 . . . " are input to the data input circuit 225-j of the reception chip 202.

Then, the output waveforms of the clock input circuit 221 and the data input circuit 225-j are as denoted by (1). The operation that is expected to be performed is to receive data "0" at down edges of the clock signal and to receive data "1" at up edges of the clock signal.

When the phase of the clock signal is advanced slightly by the clock adjustment circuit 222-j, the waveforms of the adjusted clock signal j, the reception data j [1], the reception data j [0] (first stage FF), the reception data j [0] (second stage FF), and the adjustment pattern detection signal j are as denoted by (2). The reception data j [1] expresses the signal output from the flip-flop circuit 228-j, and the reception data j [0] (first stage FF) and the reception data j [0] (second stage FF) express the signals output from the flip-flop circuits 226-j and 227-j, respectively.

In such a case, the flip-flop circuit 226-j receives data "0" at down edges of the adjusted clock signal j, and the flip-flop circuit 228-j receives data "1" at up edges of the adjusted clock signal j. Accordingly, the reception data j [1:0] corresponds to adjustment pattern "10". Accordingly, the adjustment pattern detection signal j indicates OK.

When the phase of the clock signal is advanced further by the clock adjustment circuit 222-j, the waveforms of the respective signals become as denoted by (3). In such a case, the down edges of the adjusted clock signal j come earlier than data "0", and data "1" is received at the down edges. Similarly, the up edges of the adjusted clock signal j come earlier than data "1", and data "0" is received at up edges. Due to this, the reception data j [1:0] becomes "01", which does not correspond to adjustment pattern "10". Thus, the adjustment pattern detection signal j indicates NG.

When the phase of the clock signal is delayed by the clock adjustment circuit 222-j, the waveforms of the respective signals become as denoted by (4). In such a case, the down edges of the adjusted clock signal j come later than data "0", and data "1" is received at the down edges. Similarly, the up edges of the adjusted clock signal j come later than data "1", and data "0" is received at the up edges. Due to this, the reception data j [1:0] becomes "01", which does not correspond to adjustment pattern "10". Thus, the adjustment pattern detection signal j indicates NG.

As denoted by (1) through (4), the reception data [1:0] and adjustment pattern "10" are compared to each other while the clock adjustment circuit 222-j changes the phase of the clock signal, and thereby the pattern detection result (OK or NG) is determined for each phase. The center value of the range of TAP values for which the pattern detection result is OK corresponds to the center of the data waveform, and the phase adjustment is completed by calculating the center value. The waveforms of the respective signals after the completion of the phase adjustment become as denoted by (5).

In addition to the above described phase adjustments of clock signals, a technique of correcting phases between bits of parallel data is known (see Patent Documents 1 and 2, for example).

However, the above described conventional methods of adjusting a phase involve problems, as below.

(1) Relationships in phase between clock signals and data signals are changed as time elapses due to temperature variations, power source voltage variations, clock variations caused by jitter in PLL, etc., and accordingly the phases gradually shift from the optimum phase. This makes it necessary to conduct readjustments, even during the system operation, before phases are shifted so greatly as to prevent the signal transmission. A phase adjustment requires the transmission of a training pattern with normal data transmissions being halted temporarily, which deteriorates the data transfer performance. In particular, when the transmission speed is high, readjustments need to be conducted highly frequently, which greatly influences the data transfer performance.

(2) As has been described, because phase adjustments are conducted only periodically, edges of a clock signal do not always follow the center of the data waveforms, and shifts to some extent need to be tolerated. This increases the frequency of occurrences of errors when relationships in the phases of clock signals and data signals change greatly.

Patent Document 1: Japanese Laid-open Patent Publication No. 5-145537

Patent Document 2: Japanese National Publication of International Patent Application No. 2004-531117

SUMMARY

It is an object of the invention to adjust phase relationships between a clock signal and a data signal without halting a transfer of normal data between a data transmission device and a data reception device.

An information processing apparatus according to the disclosure includes a data transmission device and a data reception device that is connected to the data transmission device and that receives data output from the data transmission device.

The data transmission device includes a reference clock generation unit, a selection circuit, and a transmission data synchronization output circuit. The reference clock generation unit generates a reference clock and the selection circuit inputs transmission target data and phase adjustment data, and selects one of the transmission target data and the phase adjustment data. The transmission data synchronization output circuit outputs the data selected by the selection circuit as transmission data in synchronization with the reference clock.

The data reception device includes a clock phase adjustment circuit, a reception data output unit, a data adjustment circuit, an adjustment reception data output unit, and a comparison unit. The clock phase adjustment circuit inputs the reference clock, and outputs a clock obtained by delaying a phase of the reference clock on the basis of a clock phase adjustment value. The reception data output unit inputs the transmission data, and outputs the input transmission data as reception data in synchronization with the delayed clock.

The data adjustment circuit inputs the transmission data and outputs adjustment target reception data obtained by delaying the transmission data on the basis of a data phase adjustment value. The adjustment reception data output unit inputs the adjustment target reception data, and outputs the input adjustment target reception data as adjustment reception data in synchronization with the delayed clock. The comparison unit inputs the reception data and the adjustment reception data, compares the reception data and the adjustment reception data, and outputs the data phase adjustment value on the basis of a result of comparison.

According to this configuration, the phase of the transmission data output from the data transmission device to the data reception device is adjusted while using the clock that has been subjected to a phase adjustment based on the clock phase adjustment value. Thereby, the data phase adjustment result can be reflected on a clock phase adjustment, making it possible, for example, to update the clock phase adjustment value on the basis of the result of the comparison by the comparison unit. The phase of data is adjusted based on the comparison between the reception data and the adjustment reception data, and accordingly such reception data does not need to be a training pattern, and can instead be normal data.

The reference clock corresponds, for example, to a clock signal output from a PLL 1011, which will be described later, and the transmission target data corresponds, for example, to one of transmission data 1 [1:0] through transmission data N [1:0], which will be explained later. Phase adjustment data corresponds, for example, to a training pattern [1:0] output from a pattern generation circuit 1013, which will be explained later.

The clock phase adjustment value corresponds, for example, to one of TAP value 1 through TAP value N, which will be explained later, and the data phase adjustment value corresponds, for example, to one of TAP2 value 1 through TAP2 value N, which will be explained later. The adjustment target reception data corresponds, for example, to a data signal output from one of data adjustment circuits 1031-1 through 1031-N, which will be explained later, and the adjustment reception data corresponds, for example, to one of adjusted reception data 1 [1:0] through adjusted reception data N [1:0], which will be explained later.

According to another aspect, the data transmission device includes a reference clock generation unit, a first selection circuit, a second selection circuit, a first transmission data synchronization output circuit, and a second transmission data synchronization output circuit. Also, the data reception device includes a first clock phase adjustment circuit, a second clock phase adjustment circuit, a first reception data output unit, a second reception data output unit, a first data adjustment circuit, a second data adjustment circuit, a first adjustment reception data output unit, a second adjustment reception data output unit, a first comparison unit, and a second comparison unit.

The reference clock generation unit generates a reference clock. The first selection circuit inputs first transmission target data and phase adjustment data, and selects one of the first transmission target data and the phase adjustment data. The first transmission data synchronization output circuit outputs the data selected by the first selection circuit as first transmission data in synchronization with the reference clock.

The second selection circuit inputs second transmission target data and phase adjustment data, and selects one of the second transmission target data and the phase adjustment data. The second transmission data synchronization output circuit outputs the data selected by the second selection circuit as second transmission data in synchronization with the reference clock.

The first clock phase adjustment circuit inputs the reference clock, and outputs a first clock obtained by delaying a phase of the reference clock on the basis of a first clock phase adjustment value. The first reception data output unit inputs the first transmission data, and outputs the input first transmission data as first reception data in synchronization with the first clock.

The first data adjustment circuit inputs the first transmission data, and outputs first adjustment target reception data obtained by delaying the first transmission data on the basis of a first data phase adjustment value. The first adjustment reception data output unit inputs the first adjustment target reception data, and outputs the input first adjustment target reception data as first adjustment reception data in synchronization with the first clock. The first comparison unit inputs the first reception data and the first adjustment reception data, compares the first reception data and the first adjustment reception data, and outputs the first data phase adjustment value on the basis of a result of comparison.

The second clock phase adjustment circuit inputs the reference clock, and outputs a second clock obtained by delaying a phase of the reference clock on the basis of a second clock phase adjustment value. The second reception data output unit inputs the second transmission data, and outputs the input second transmission data as second reception data in synchronization with the second clock.

The second data adjustment circuit inputs the second transmission data, and outputs second adjustment target reception data obtained by delaying the second transmission data on the basis of a second data phase adjustment value. The second adjustment reception data output unit inputs the second adjustment target reception data, and outputs the input second adjustment target reception data as second adjustment reception data in synchronization with the second clock. The second comparison unit inputs the second reception data and the second adjustment reception data, compares the second reception data and the second adjustment reception data, and outputs the second data phase adjustment value on the basis of a result of comparison.

According to the above configuration, phases of the first and second transmission data output from the data transmission device to the data reception device are adjusted while using the first and second clocks that have been subjected to a phase adjustment based on the first and second clock phase adjustment values.

Thereby, the data phase adjustment result can be reflected on a clock phase adjustment, making it possible, for example, to update the first and second clock phase adjustment values on the basis of the results of the comparisons by the first and second comparison units. The phase of data is adjusted on the basis of the comparisons between the first/second reception data and the first/second adjustment reception data, and accordingly such first and second reception data do not need to be a training pattern, and can instead be normal data.

The reference clock corresponds, for example, to a clock signal output from a PLL 1011, which will be explained later, and the first and second transmission target data corresponds, for example, to one of transmission data 1 [1:0] through transmission data N [1:0], which will be explained later. The phase adjustment data corresponds, for example, to a training pattern [1:0] output from a pattern generation circuit 1013, which will be explained later.

The first and second clock phase adjustment values correspond, for example, to one of a TAP value 1 through a TAP value N, which will be explained later, and the first and second data phase adjustment values correspond, for example, to one of a TAP2 value 1 through TAP2 value N, which will be explained later. The first and second adjustment target reception data corresponds, for example, to a data signal output from one of data adjustment circuits 1031-1 through 1031-N, which will be explained later, and the first and second adjustment reception data corresponds, for example, to one of adjusted reception data 1 [1:0] through adjusted reception data N [1:0].

According to an information processing apparatus according to the disclosure, the phase of a clock signal can continuously be adjusted without halting a transfer of normal data. Accordingly, performances in a phase adjustment and data transfer are enhanced.

BRIEF DESCRIPTION OF DRAWINGS

FIG. 6 illustrates outputs of a conventional decoder;

FIG. 9 illustrates a flowchart for conventional phase adjustment operations;

FIG. 12 illustrates a configuration of a clock adjustment control circuit according to an embodiment;

FIG. 13 illustrates a flowchart for initialization operations of a TAP control circuit according to an embodiment;

FIG. 14 illustrates a flowchart for operations performed by the TAP control circuit according to the embodiment when the system is being operated;

FIG. 16 illustrates outputs of a decoder according to an embodiment;

FIG. 17 illustrates a configuration of a data adjustment control circuit according to an embodiment:

FIG. 18 illustrates a flowchart of operations performed by a TAP2 control circuit according to an embodiment;

DESCRIPTION OF EMBODIMENTS

Figure 1:
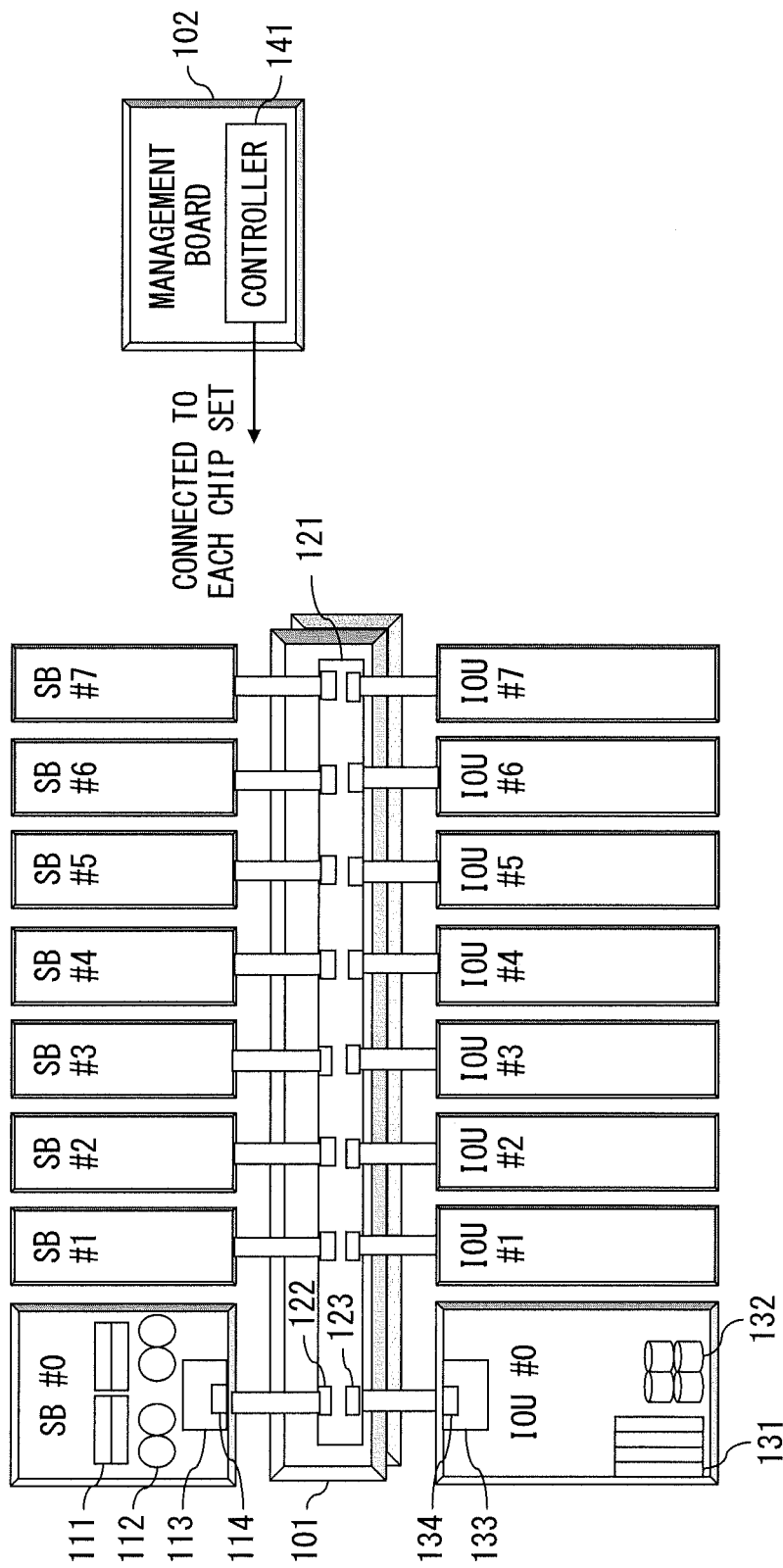
FIG. 1 illustrates a configuration of a computer system.

Hereinbelow, the best mode of carrying out the invention will be explained in detail by referring to the drawings.

Figure 11A:
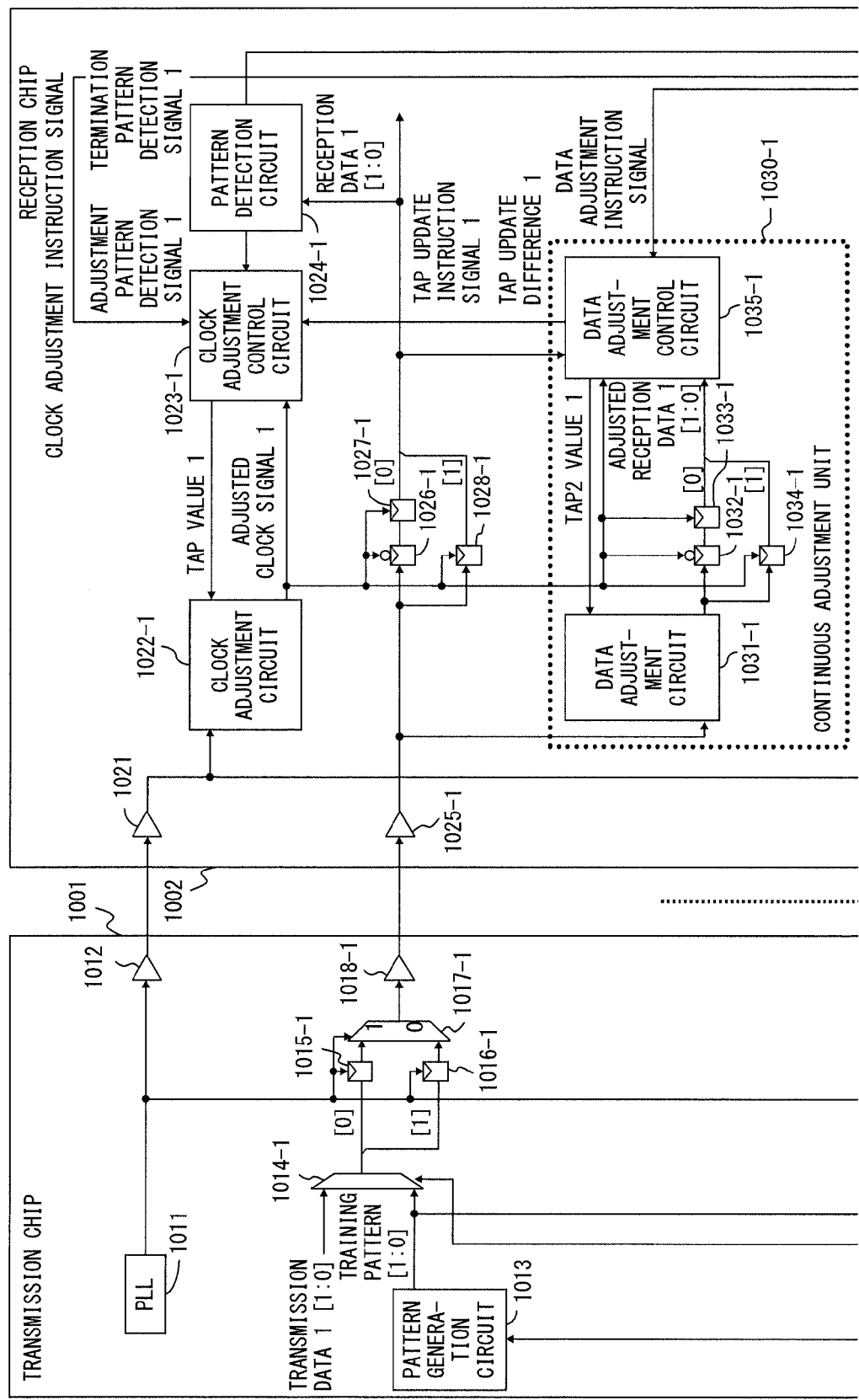
FIG. 11A illustrates configurations of a transmission chip and a reception chip according to an embodiment (first part)
Figure 11B:
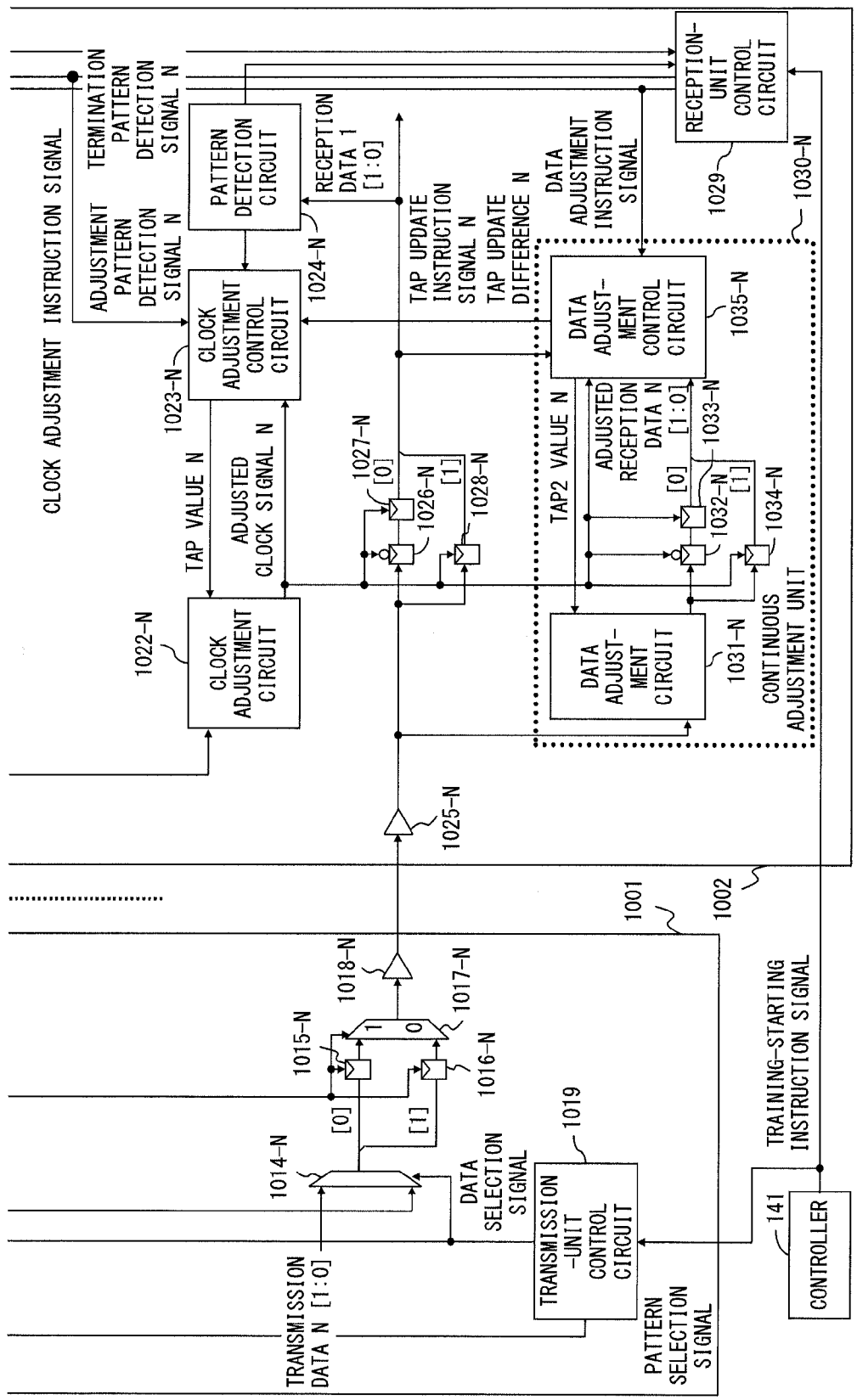
FIG. 11B illustrates configurations of a transmission chip and a reception chip according to an embodiment (second part)

FIGS. 11A and 11B illustrate examples of configurations of a transmission chip and a reception chip. A transmission chip 1001 and a reception chip 1002 are connected to each other through a clock signal line and N data signal lines.

The transmission chip 1001 includes a phase-locked loop circuit (PLL) 1011, a clock output circuit 1012, a pattern generation circuit 1013, data selection circuits 1014-1 through 1014-N, flip-flop circuits 1015-1 through 1015-N and 1016-1 through 1016-N, bit selection circuits 1017-1 through 1017-N, data output circuits 1018-1 through 1018-N, and a transmission-unit control circuit 1019.

The reception chip 1002 includes a clock input circuit 1021, a clock adjustment circuits 1022-1 through 1022-N, clock adjustment control circuits 1023-1 through 1023-N, pattern detection circuits 1024-1 through 1024-N, data input circuits 1025-1 through 1025-N, flip-flop circuits 1026-1 through 1026-N, 1027-1 through 1027-N, and 1028-1 through 1028-N, a reception-unit control circuit 1029, and continuous adjustment units 1030-1 through 1030-N.

Figure 2A:
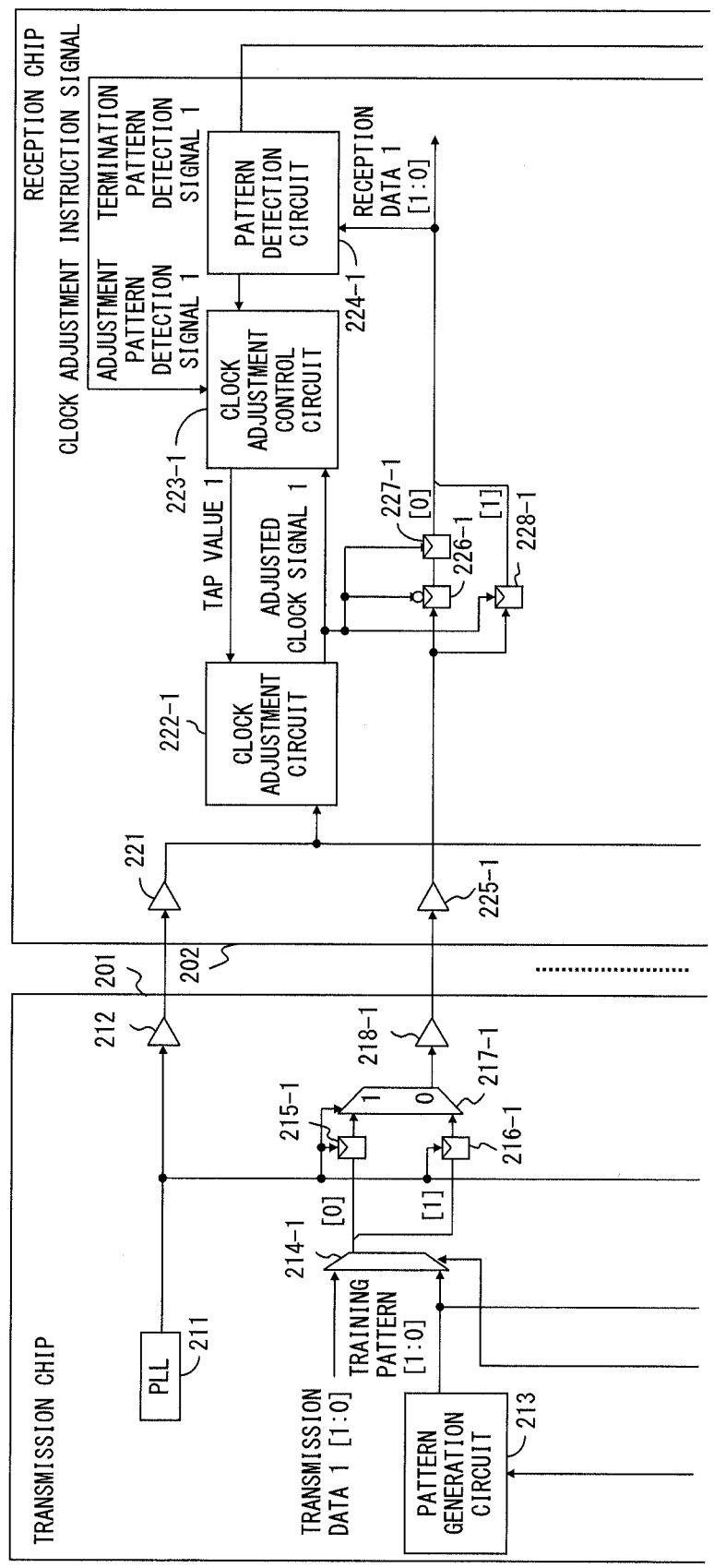
FIG. 2A illustrates configurations of a transmission chip and a reception chip according to a conventional technique (first part)
Figure 2B:
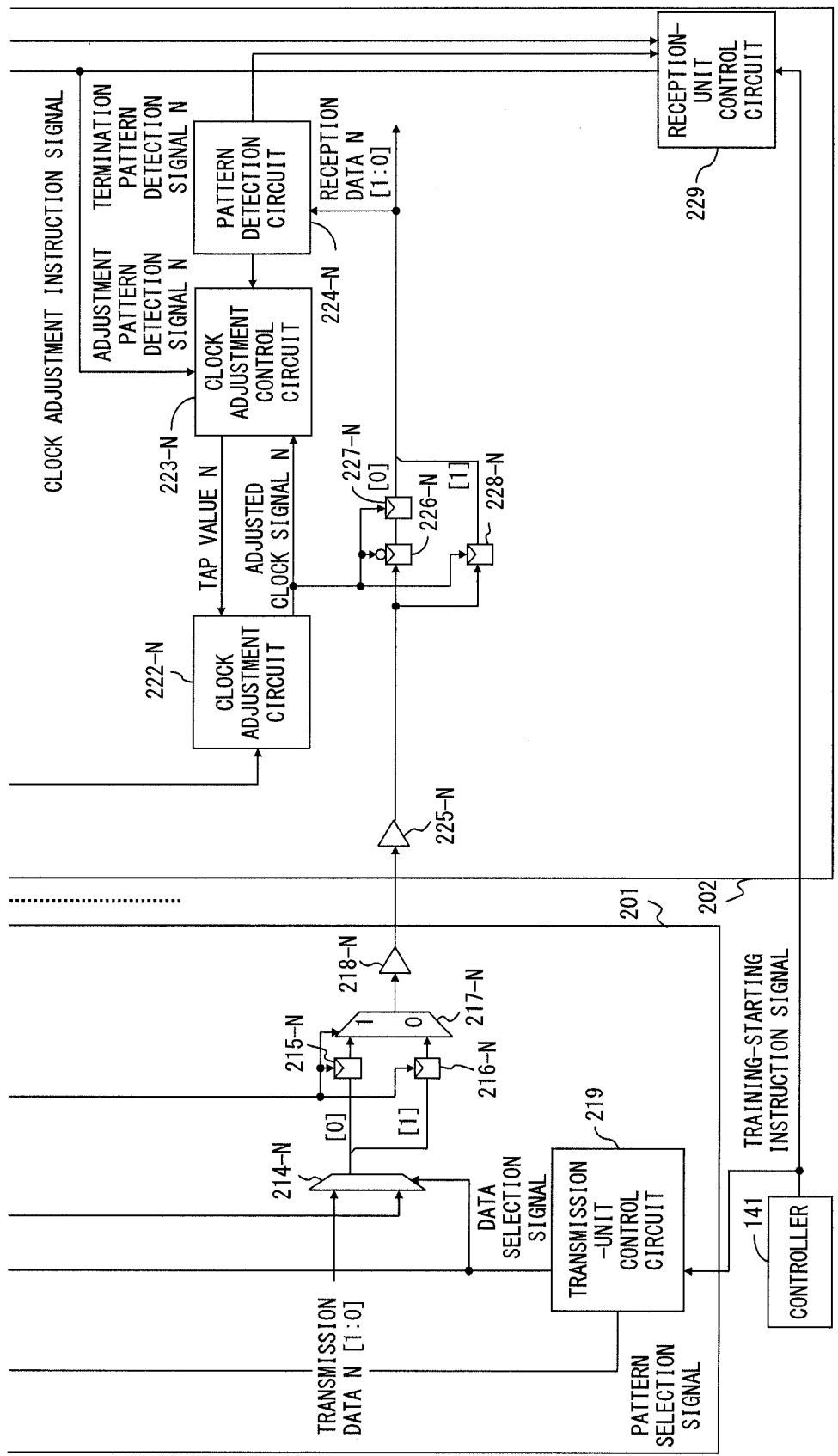
FIG. 2B illustrates configurations of a transmission chip and a reception chip according to a conventional technique (second part)
Figure 3:
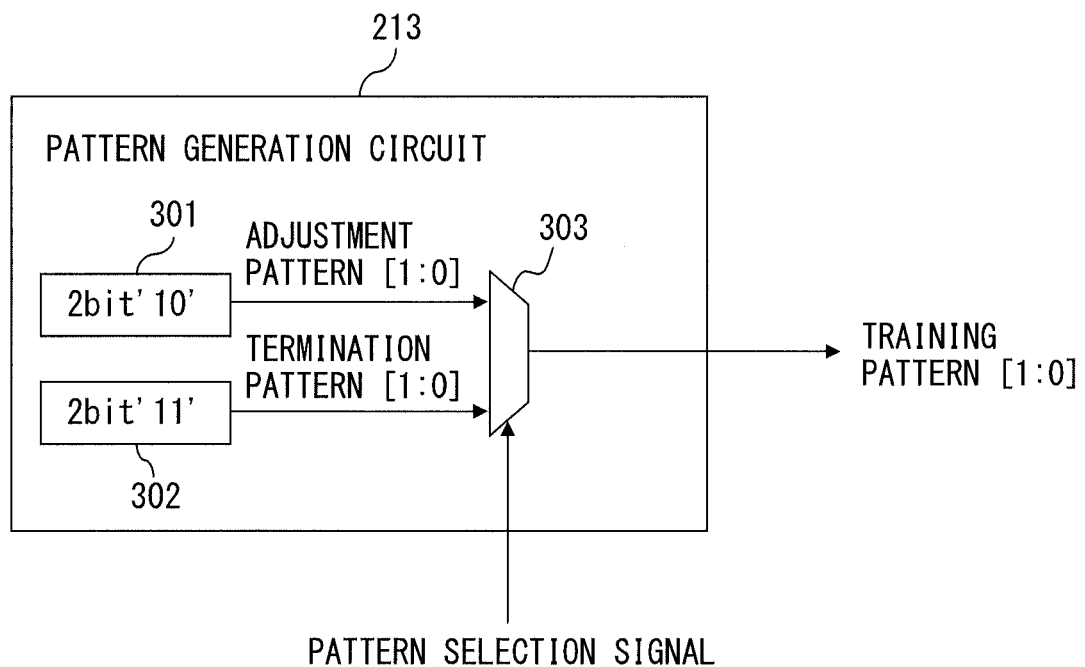
FIG. 3 illustrates a configuration of a conventional pattern generation unit.
Figure 4:
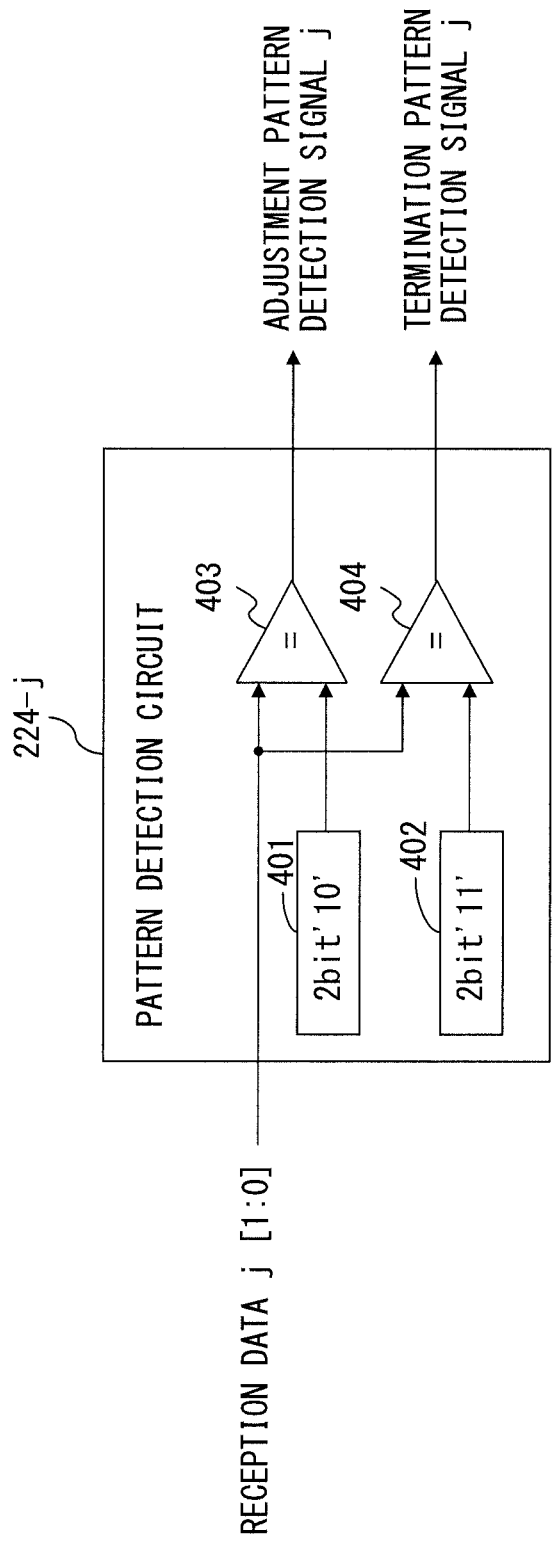
FIG. 4 illustrates a configuration of a conventional pattern detection circuit.
Figure 5:
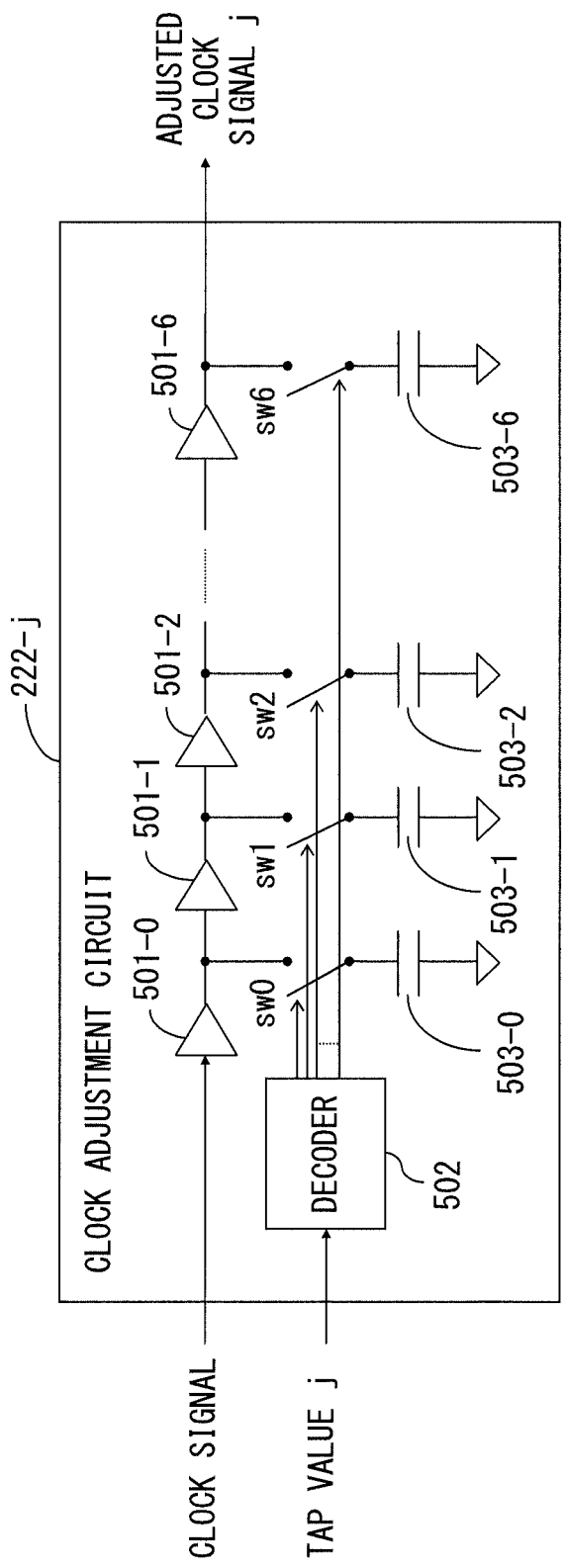
FIG. 5 illustrates a configuration of a conventional clock adjustment circuit.
Figure 7:
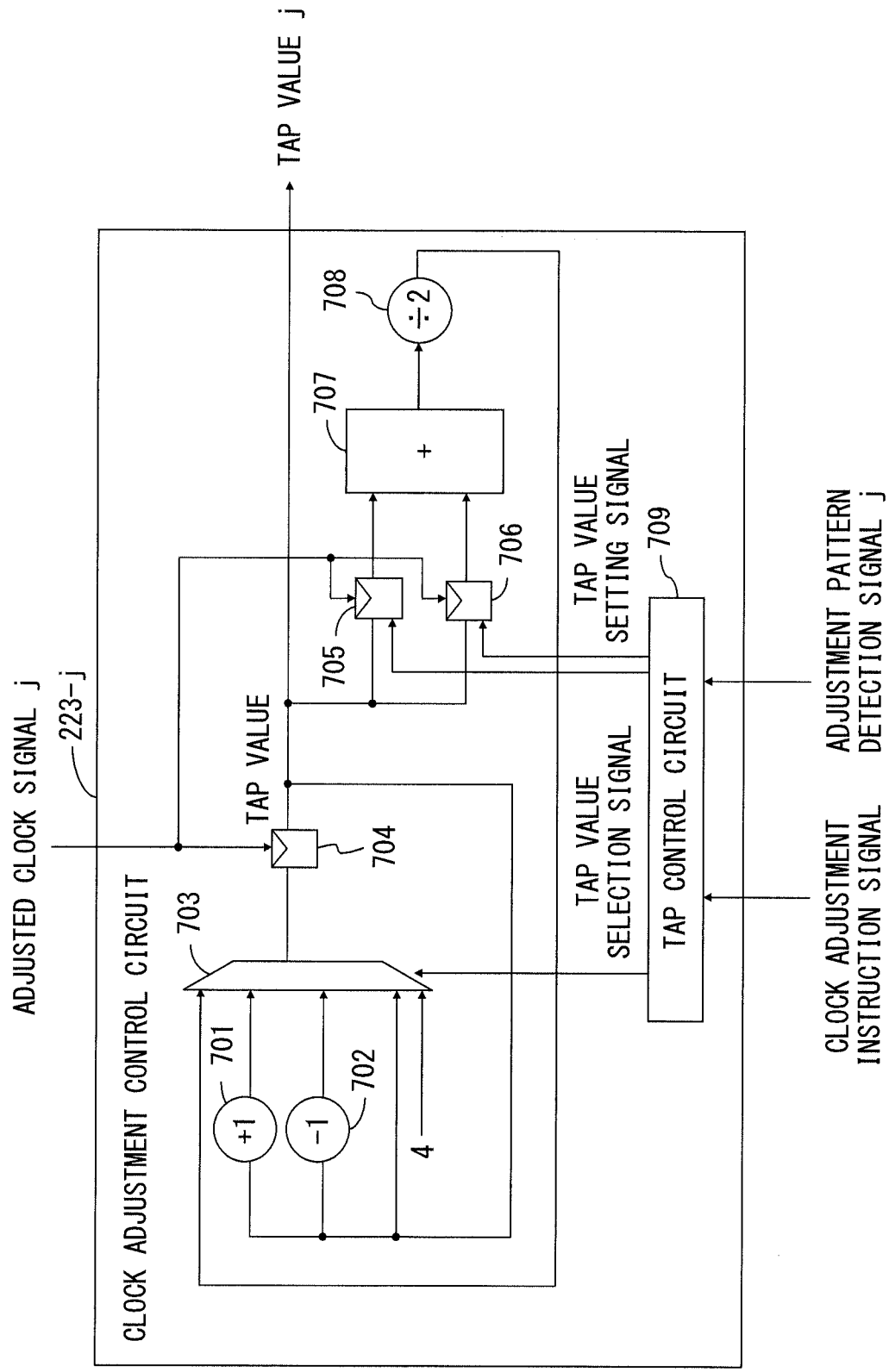
FIG. 7 illustrates a configuration of a conventional clock adjustment control circuit.

Among these, the pattern generation circuit 1013 has the similar configuration to that in FIG. 3, the pattern detection circuits 1024-1 through 1024-N have the similar configuration to that in FIG. 4, and the clock adjustment circuits 1022-1 through 1022-N have the similar configuration to that in FIG. 5. Also, operations of circuits other than the transmission-unit control circuit 1019, the reception-unit control circuit 1029, the clock adjustment control circuits 1023-1 through 1023-N, and the continuous adjustment units 1030-1 through 1030-N are the similar to those illustrated in FIGS. 2A and 2B.

The transmission-unit control circuit 1019 outputs a pattern selection signal to the pattern generation circuit 1013 in accordance with a training-starting instruction signal from the controller 141, and outputs a data selection signal to the data selection circuits 1014-1 through 1014-N.

Each continuous adjustment unit 1030-$j$ (j=1 through N) includes a data adjustment circuit 1031-$j$, flip-flop circuits 1032-$j$, 1033-$j$, and 1034-$j$, and a data adjustment control circuit 1035-$j$.

The reception-unit control circuit 1029 outputs a clock adjustment instruction signal to the clock adjustment control circuits 1023-1 through 1023-N in accordance with a training-starting instruction signal from the controller 141. When conducting a continuous adjustment after the system operation is started, the data adjustment instruction signal is output to the data adjustment control circuits 1035-1 through 1035-N.

Each data adjustment circuit 1031-$j$ delays the phase of a data signal from the data input circuit 1025-$j$ in accordance with a TAP2 value j from the data adjustment control circuit 1035-$j$, and outputs the delayed data signal to the flip-flop circuits 1032-$j$ and 1034-$j$.

The flip-flop circuit 1032-$j$ latches the data signal in synchronization with the inversion signal of the adjusted clock signal j, and outputs the signal to the flip-flop circuit 1033-$j$. The flip-flop circuit 1033-$j$ latches the signal output from the flip-flop circuit 1032-$j$ in synchronization with the adjusted clock signal j, and outputs the signal as the value of bit 0 of the adjusted reception data. The flip-flop circuit 1034-$j$ latches the data signal in synchronization with the adjusted clock signal j, and outputs the signal as the value of bit 1 of the adjusted reception data. In this manner, a 2-bit adjusted reception data j [1:0] is generated, and the data is output to the data adjustment control circuit 1035-$j$.

Each data adjustment control circuit 1035-$j$ starts a phase adjustment of a data signal in accordance with a data adjustment instruction signal, and increases or decreases a TAP2 value j in accordance with the result of a comparison between the reception data j [1:0] and the adjusted reception data j [1:0]. Thereafter, the data adjustment control circuit 1035-$j$ outputs a TAP2 value j to the data adjustment circuit 1031-$j$, and also outputs to the clock adjustment control circuit 1023-$j$ a TAP update instruction signal j and a TAP update difference j.

Each clock adjustment control circuit 1023-$j$ starts a phase adjustment of a clock signal in accordance with a clock adjustment instruction signal, and increases or decreases a TAP value j in accordance with the TAP update instruction signal j, the TAP update difference j, and the adjustment pattern detection signal j from the pattern detection circuit 1024-$j$. Thereafter, the clock adjustment control circuit 1023-$j$ outputs the TAP value j to the clock adjustment circuit 1022-$j$.

In the initial adjustment, which is conducted immediately after the power of the computer system has been turned on, a phase adjustment of a clock signal is conducted by using a training pattern output from the pattern generation circuit 1013. However, during the system operation, a phase adjustment of clock signals is conducted without using training patterns.

During the operation, the transmission chip 1001 continuously outputs the transmission data j [1:0] as normal data. The reception chip 1002 receives the normal data while changing the TAP2 value j, and compares the normal data received on the basis of the TAP2 value j and the normal data received on the basis of the TAP value j so as to calculate the TAP value that corresponds to the center of the data waveform.

In such a case, the reception data itself is used as an expected value, and accordingly scrambles such as 8B10B or PRBS (Pseudo-Random Bit Sequence) or the like are typically performed so that a data pattern is changed and it is possible to determine whether or not data can be received, although it is not possible to do this when the data pattern does not change.

Additionally, part or all of TAP values 1 through N have the same value in some cases, while all of TAP values 1 through N have different values in other cases.

FIG. 12 illustrates an example of a configuration of the clock adjustment control circuit 1023-$j$ illustrated in FIGS. 11A and 11B. The clock adjustment control circuit 1023-$j$ includes a TAP update circuit 1101, an incrementer 1102, a decrementer 1103, a TAP value selection circuit 1104, flip-flop circuits 1105, 1106, and 1107, an adder circuit 1108, a divider circuit 1109, and a TAP control circuit 1110.

The TAP control circuit 1110 starts a phase adjustment in accordance with a clock adjustment instruction signal from the reception-unit control circuit 1029. Then, the TAP control circuit 1110 outputs a TAP value selection signal to the TAP value selection circuit 1104 in accordance with the TAP update instruction signal j and the adjustment pattern detection signal j from the data adjustment control circuit 1035-$j$ and the pattern detection circuit 1024-$j$, respectively, and outputs a TAP value setting signal to the flip-flop circuits 1106 and 1107.

The TAP update circuit 1101 subtracts, from the TAP value output from the flip-flop circuit 1105, the TAP update difference j from the data adjustment control circuit 1035-*j*, and outputs the subtraction result to the TAP value selection circuit 1104 as the TAP update value. The incrementer 1102 adds 1 to the TAP value output from the flip-flop circuit 1105, and outputs the resultant value to the TAP value selection circuit 1104 while the decrementer 1103 subtracts 1 from the TAP value output from the flip-flop circuit 1105, and outputs the resultant value to the TAP value selection circuit 1104.

The TAP value selection circuit 1104 selects one of the TAP values output from the flip-flop circuit 1105, the TAP update circuit 1101, the incrementer 1102, the decrementer 1103, and the divider circuit 1109, and outputs the selected TAP value to the flip-flop circuit 1105.

The flip-flop circuit 1105 latches the TAP value output from the TAP value selection circuit 1104 in synchronization with the adjusted clock signal j, and outputs the TAP value as the TAP value j. The flip-flop circuit 1106 latches the TAP value j in synchronization with the adjusted clock signal j, and outputs the TAP value j to the adder circuit 1108 as the upper limit value. The flip-flop circuit 1107 latches the TAP value j in synchronization with the adjusted clock signal j, and outputs the TAP value j to the adder circuit 1108 as the lower limit value. Also, the flip-flop circuits 1106 and 1107 hold the upper limit value and the lower limit value in accordance with the respective TAP value setting signals.

The adder circuit 1108 adds the upper limit value and the lower limit value output respectively from the flip-flop circuit 1106 and the flip-flop circuit 1107, and outputs the addition result to the divider circuit 1109. The divider circuit 1109 outputs half the addition result to the TAP value selection circuit 1104.

Figure 8:
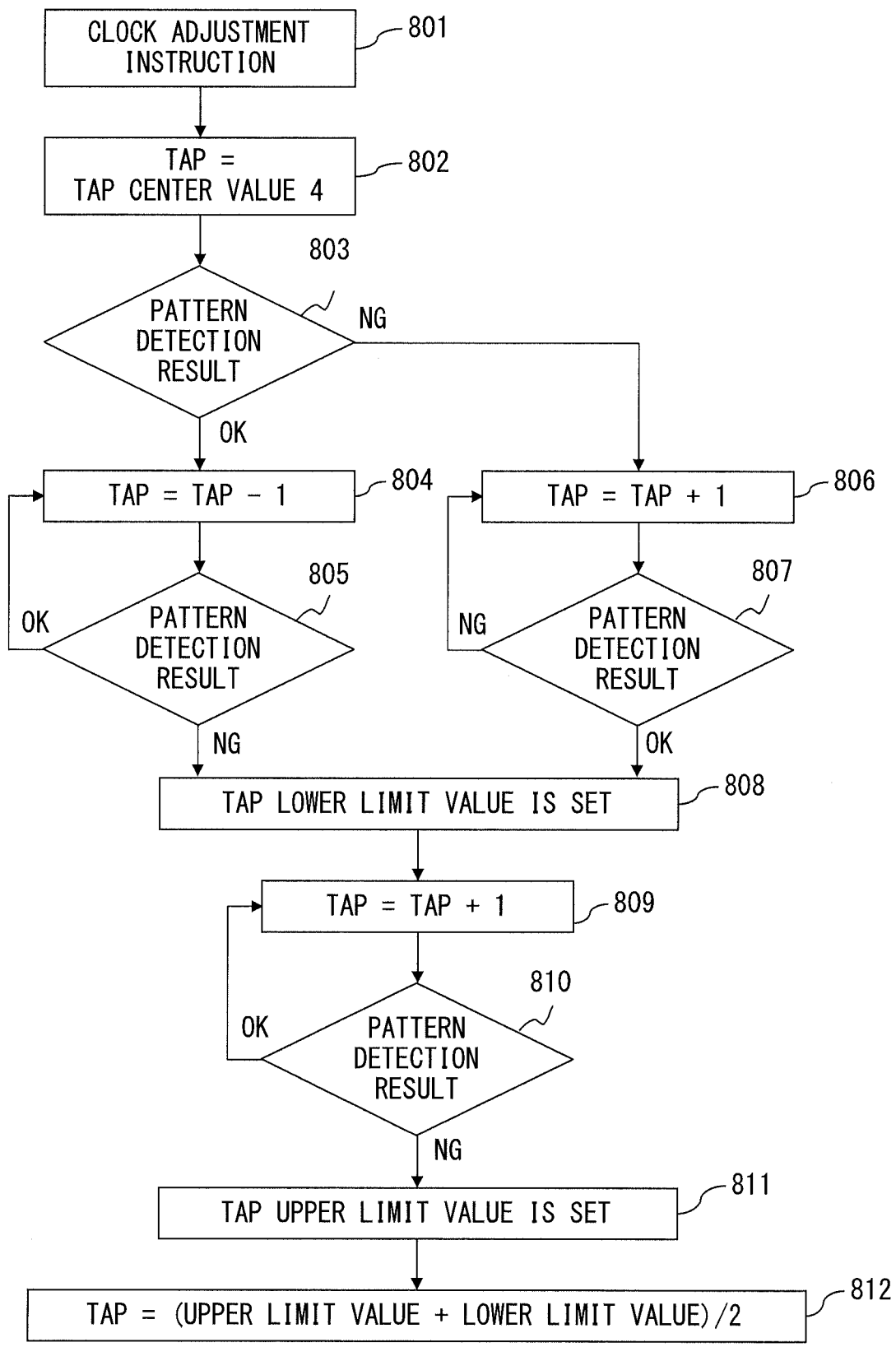
FIG. 8 illustrates a flowchart for operations performed by a conventional TAP control circuit.
Figure 10A:
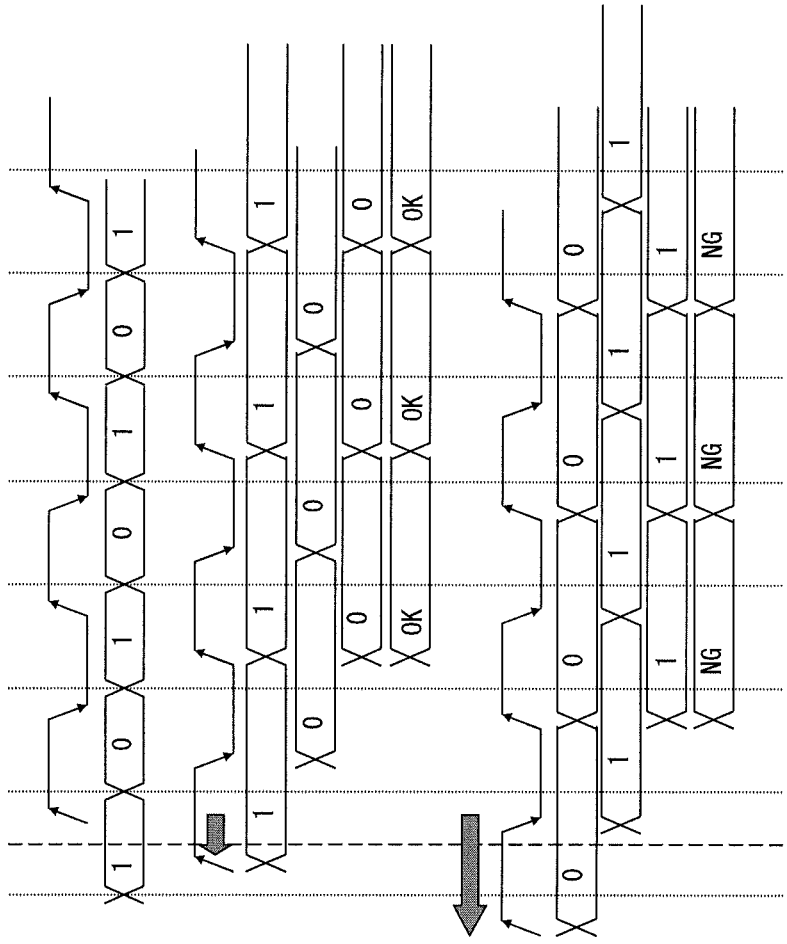
FIG. 10A illustrates a timing chart for conventional phase adjustment operations (first part)
Figure 10B:
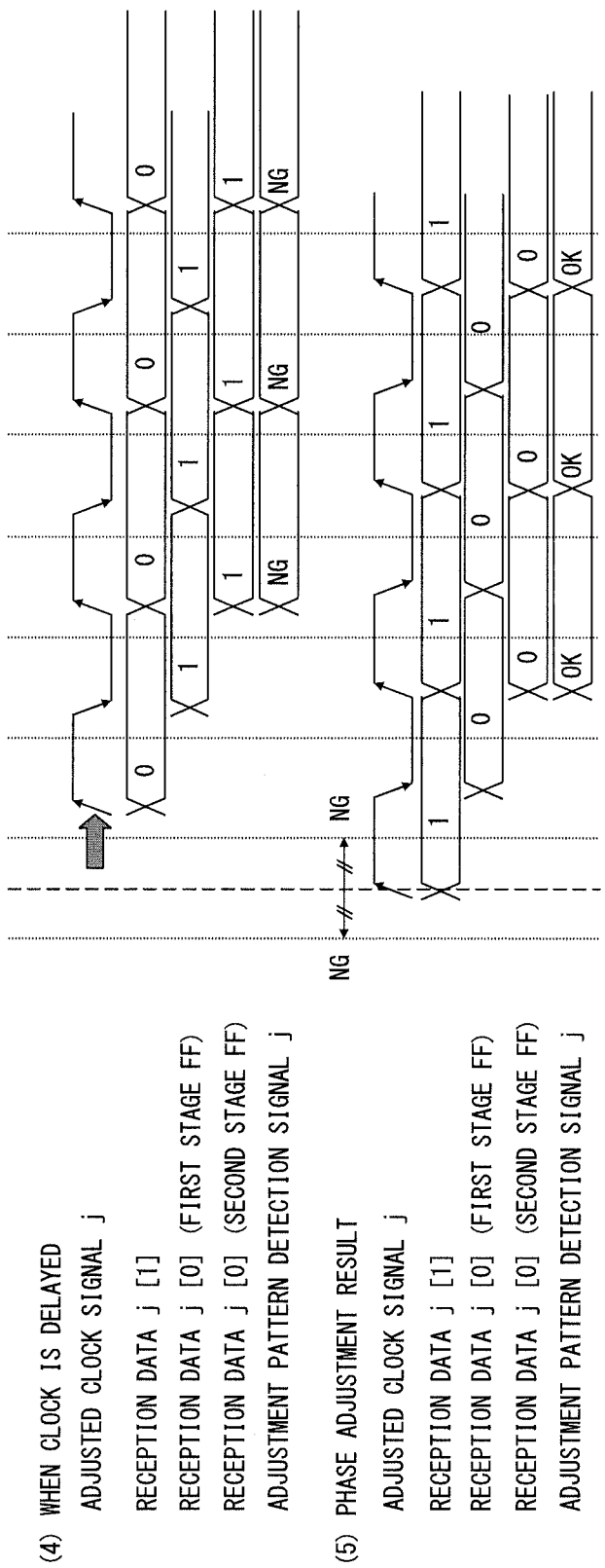
FIG. 10B illustrates a timing chart for conventional phase adjustment operations (second part)

FIG. 13 is a flowchart for operations of the TAP control circuit 1110 when performing initialization. The operations in steps 1201 through 1212 are similar to those in steps 801 through 812 in FIG. 8.

FIG. 14 is a flowchart for updating operations performed by the TAP update circuit 1101 during the system operation. Having received the TAP update instruction signal j from the data adjustment control circuit 1035-*j* (step 1301), the TAP control circuit 1110 outputs a TAP value selection signal for selecting a TAP update value (step 1302). Thereby, a TAP update value output from the TAP update circuit 1101 is output to the clock adjustment circuit 1022-*j* as a TAP value j.

Figure 15:
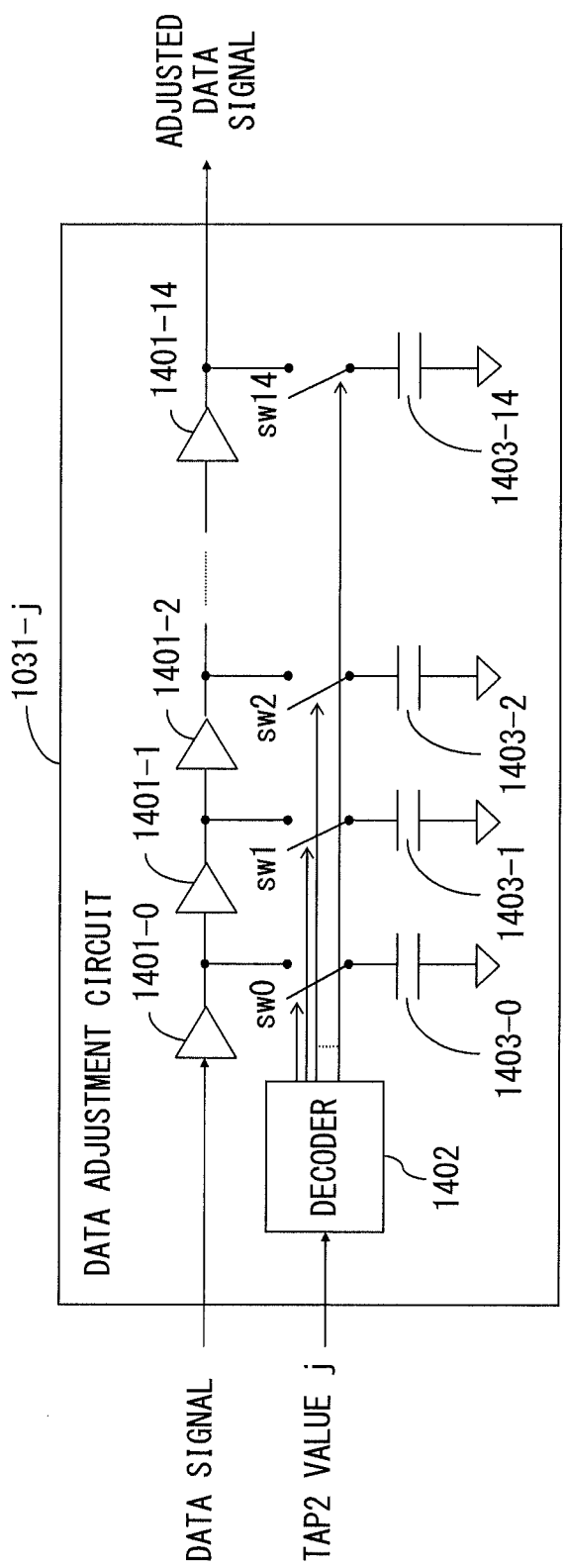
FIG. 15 illustrates a configuration of a data adjustment circuit according to an embodiment.

FIG. 15 illustrates an example of a configuration of the data adjustment circuit 1031-*j* illustrated in FIGS. 11A and 11B. The data adjustment circuit 1031-*j* includes a delay line and a decoder 1402. The delay line includes buffer circuits 1401-0 through 1401-14, switches sw0 through sw14, and capacitors 1404-0 through 1404-14.

The decoder 1402 turns on/off the switches sw0 through sw14 in accordance with the TAP2 value j from the data adjustment control circuit 1035-*j* so as to change the load capacity of the delay line. Thereby, the delay amount by the delay line is controlled so that phases of input data signals are changed.

FIG. 16 illustrates the correspondence between the TAP2 values j and switching signals output from the decoder 1402 to the switches sw0 through sw14. The switches swk (k=0 through 14) are turned on when the input switching signal is logic "1", and is turned off when the input switching signal is logic "0". In this case, one of sixteen delay amount stages can be set by using a 4-bit TAP2 value j [3:0] expressing one of "−8" through "7".

FIG. 17 illustrates an example of a configuration of the data adjustment control circuit 1035-*j* illustrated in FIGS. 11A and 11B. The data adjustment control circuit 1035-*j* includes an incrementer 1501, a decrementer 1502, a TAP2 value selection circuit 1503, flip-flop circuits 1504, 1505, and 1506, an adder circuit 1507, a divider circuit 1508, a comparator 1509, and a TAP2 control circuit 1510.

The comparator 1509 compares the reception data j [1:0] and the adjusted reception data j [1:0] respectively from the flip-flop circuits 1027-1 and 1028-1 and the flip-flop circuits 1033-1 and 1034-1, and outputs the data comparison result to the TAP2 control circuit 1510.

The TAP2 control circuit 1510 starts a phase adjustment of a data signal in accordance with a data adjustment instruction signal from the reception-unit control circuit 1029. Then, the TAP2 control circuit 1510 outputs a TAP2 value selection signal to the TAP2 value selection circuit 1503 in accordance with the data comparison result from the comparator 1509, and also outputs the TAP2 value setting signal to the flip-flop circuits 1505 and 1506.

The incrementer 1501 adds 1 to the TAP2 value output from the flip-flop circuit 1504 so as to output the resultant value to the TAP2 value selection circuit 1503 while the decrementer 1502 subtracts 1 from the TAP2 value output from the flip-flop circuit 1504 so as to output the resultant value to the TAP2 value selection circuit 1503.

In accordance with the TAP2 value selection signal, the TAP2 value selection circuit 1503 selects one of the TAP2 values output from the flip-flop circuit 1504, the incrementer 1501, and the decrementer 1502, or zero (the TAP2 center value) and outputs the selected value to the flip-flop circuit 1504.

The flip-flop circuit 1504 latches the TAP2 value output from the TAP2 value selection circuit 1503 in synchronization with the adjusted clock signal j, and outputs the value as the TAP2 value j. The flip-flop circuit 1505 latches the TAP2 value j in synchronization with the adjusted clock signal j, and outputs the value to the adder circuit 1507 as the upper limit value. The flip-flop circuit 1506 latches the TAP2 value j in synchronization with the adjusted clock signal j, and outputs the value to the adder circuit 1507 as the lower limit value. Also, the flip-flop circuits 1505 and 1506 hold the upper and lower limit values in accordance with the respective TAP2 value setting signals.

The adder circuit 1507 adds the upper and lower limit values output from the flip-flop circuit 1505 and the flip-flop circuit 1506, respectively, and outputs the addition result to the divider circuit 1508. The divider circuit 1508 outputs half the addition result to the clock adjustment control circuit 1023-*j* as the TAP update difference j, and also outputs the TAP update instruction signal j to the clock adjustment control circuit 1023-*j*.

FIG. 18 is a flowchart for operations performed by the TAP2 control circuit 1510 when the system is in operation. Having received a data adjustment instruction signal from the reception-unit control circuit 1029 (step 1601), the TAP2 control circuit 1510 outputs a TAP2 value selection signal that selects TAP2 center value zero (step 1602). Thereby, zero is output to the data adjustment circuit 1031-*j* as the TAP2 value j.

Next, a TAP2 value selection signal that selects a smaller TAP2 value is output (step 1603). Thereby, "−1" output from the decrementer 1502 is output to the data adjustment circuit 1031-*j* as the TAP2 value j.

Next, the data comparison result from the comparator 1509 is determined (step 1604). When the reception data j [1:0] and the adjusted reception data j [1:0] correspond to each other, the data comparison result is determined to be OK, and when they do not correspond, the result is determined to be NG.

When the data comparison result is OK, the operation in step 1603 is repeated, and when the data comparison result has become NG, the TAP2 value setting signal is output to the flip-flop circuit 1506 (step 1605). Thereby, the current TAP2 value j is set in the flip-flop circuit 1506 as the lower limit value.

Next, a TAP2 value selection signal that selects the TAP2 center value zero is output (step 1606), and subsequently a TAP2 value selection signal that selects a greater TAP2 value is output (step 1607). Thereby, "+1" output from the incrementer 1501 is output to the data adjustment circuit 1031-j as the TAP2 value j.

Next, the data comparison result from the comparator 1509 is determined (step 1608), and when the data comparison result is OK, the operation in step 1607 is repeated. When the data comparison result has become NG, the TAP2 value setting signal is output to the flip-flop circuit 1505 (step 1609).

Thereby, the current TAP2 value j is set in the flip-flop circuit 1505 as the upper limit value, and the average value between the upper and lower limit values is output to the clock adjustment control circuit 1023-j as the TAP update difference j (step 1610).

Figure 19:
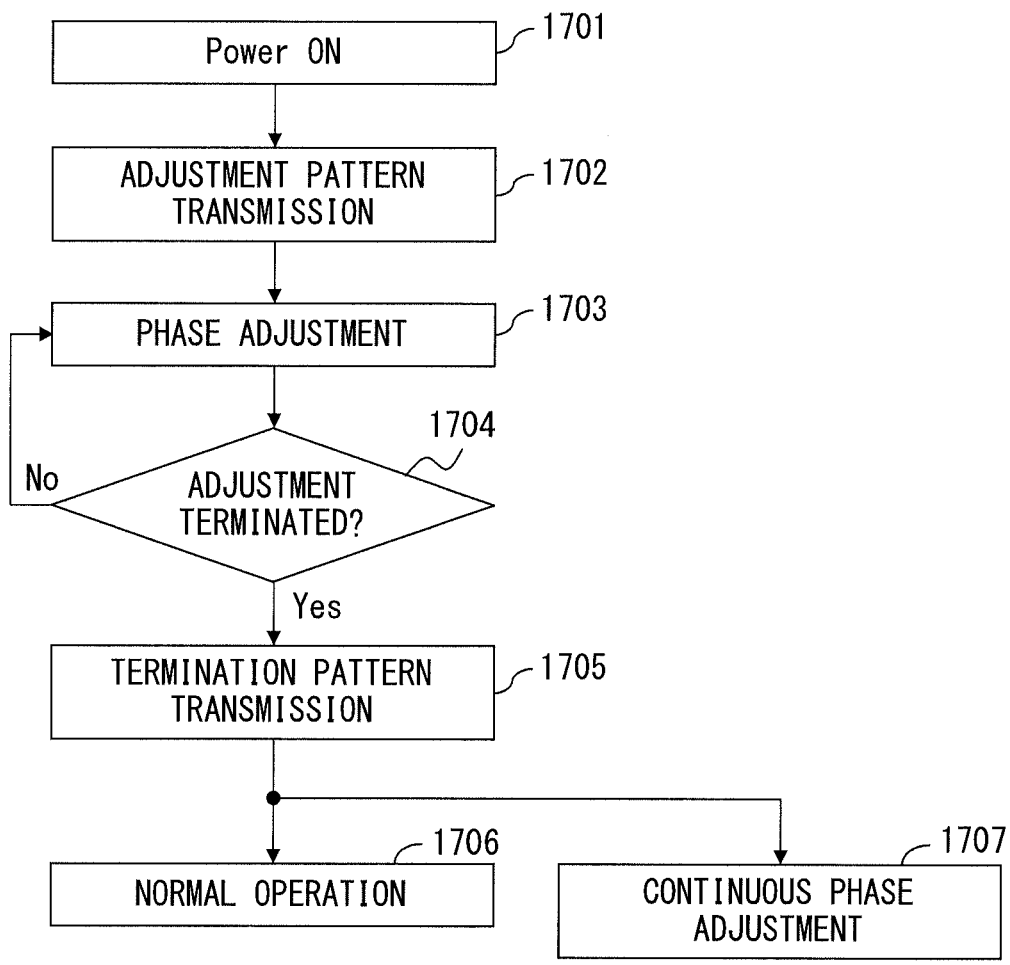
FIG. 19 illustrates a flowchart of phase adjustment operations according to an embodiment.

FIG. 19 is a flowchart for phase adjustment operations performed by the controller 141, the transmission chip 1001, and the reception chip 1002 illustrated in FIGS. 11A and 11B. The transmission-unit control circuit 1019 and the reception-unit control circuit 1029 start a phase adjustment in response to an instruction from the external environment when the system is to be initialized. When the system is being operated, the transmission-unit control circuit 1019 does not perform phase adjustment operations, and the reception-unit control circuit 1029 instructs the data adjustment control circuits 1035-1 through 1035-N to perform a data adjustment.

The operations in steps 1701 through 1705 for initialization are similar to those in steps 901 through 905 in FIG. 9.

When a termination pattern is transmitted from the transmission chip 1001 to the reception chip 1002, the pattern detection circuits 1024-1 through 1024-N output to the reception-unit control circuit 1029 termination pattern detection signals 1 through N, which indicate the termination of phase adjustments. The reception-unit control circuit 1029 outputs a data adjustment instruction signal to the data adjustment control circuits 1035-1 through 1035-N. Thereby, a normal operation using the adjusted clock signals 1 through N is performed (step 1706), and the TAP values 1 through N are continuously updated by the continuous adjustment units 1030-1 through 1030-N (step 1707).

Figure 20A:
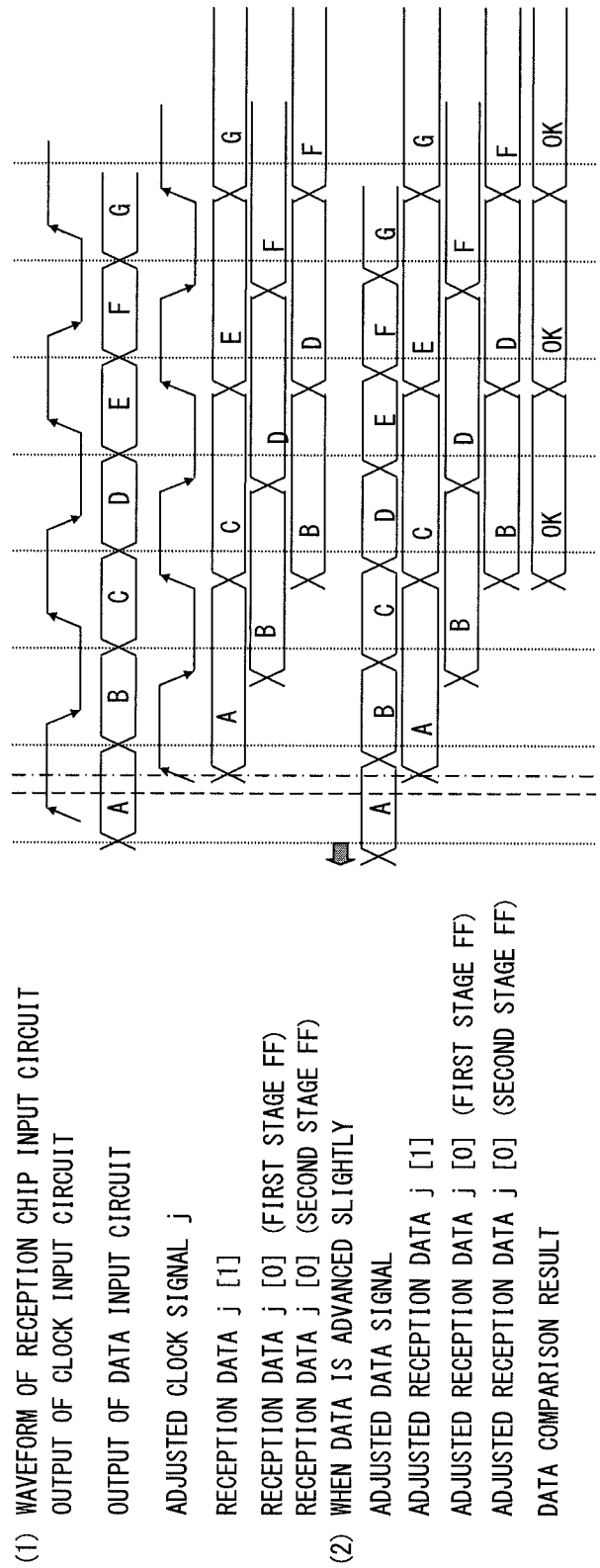
FIG. 20A illustrates a timing chart of phase adjustment operations according to an embodiment (first part).
Figure 20B:
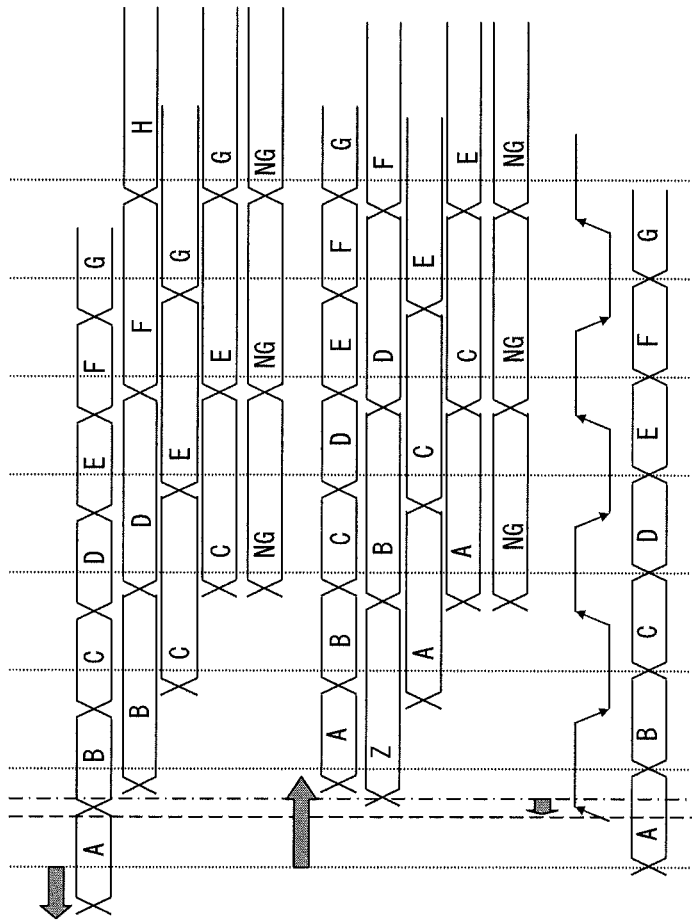
FIG. 20B illustrates a timing chart of phase adjustment operations according to an embodiment (second part).

FIGS. 20A and 20B are a timing chart depicting an example of phase adjustment operations performed by the reception chip 1002 in FIGS. 11A and 11B during the system operation. When the system is being operated, the transmission data j [1:0] is output from the data output circuit 1018-j of the transmission chip 1001, and a data string such as "ABCDEFG . . ." is input to the data input circuit 1025-j.

Then, the waveforms output from the clock input circuit 1021 and the data input circuit 1025-j and the waveforms of the adjusted clock signal j, the reception data j [1], the reception data j [0] (first stage FF), and the reception data j [0] (second stage FF) are as denoted by (1). The reception data j [1] expresses the signal output from the flip-flop circuit 1028-j. The reception data j [0] (first stage FF) and the reception data j [0] (second stage FF) respectively express signals output from the flip-flop circuits 1026-j and 1027-j, respectively.

The operations expected to be performed are to receive data "A", "C", "E", "G", etc. at up edges of the clock signal and to receive data "B", "D", "F", etc. at down edges. In this example, it is assumed that "TAP value=5" is set.

For example, when the phase of a data signal is advanced slightly by the data adjustment circuit 1031-j under the setting of "TAP2 value=−1", the waveforms of the adjusted data signal, the adjusted reception data j [1], the adjusted reception data j [0] (first stage FF), the adjusted reception data j [0] (second stage FF), and the data comparison result are as denoted by (2).

The adjusted data signal expresses a signal output from the data adjustment circuit 1031-j, and the adjusted reception data j [1] expresses a signal output from the flip-flop circuit 1034-j. The adjusted reception data j [0] (first stage FF) and the adjusted reception data j [0] (second stage FF) respectively express signals output from the flip-flop circuits 1032-j and 1033-j, respectively. Also, the data comparison result expresses a signal output from the comparator 1509.

In such a case, the flip-flop circuit 1032-j has received adjusted data "B", "D", "F", etc. at down edges of the adjusted clock signal j. Also, the flip-flop circuit 1034-j has received adjusted data "A", "C", "E", "G", etc. at up edges of the adjusted clock signal j. Accordingly, the adjusted reception data j [1:0] corresponds to the reception data j [1:0]. Accordingly, the data comparison result is OK.

When phases of data signals are further advanced by the data adjustment circuit 1031-j when the TAP2 value is −3, the waveforms of the respective signals become as denoted by (3).

In such a case, down edges of the adjusted clock signal j come later than adjusted data "B", "D", "F", etc., and adjusted data "B", "D", "F", etc. is received at up edges. Similarly, up edges of the adjusted clock signal j come later than adjusted data "A", "C", "E", "G", etc., and adjusted data "A", "C", "E", "G", etc. is received at down edges. Accordingly, the adjusted reception data j [1:0] does not correspond to the reception data j [1:0]. Thus, the data comparison result is NG.

When phases of data signals are delayed by the data adjustment circuit 1031-j when a TAP2 value is +5, the waveforms of the respective signals are as denoted by (4).

In such a case, down edges of the adjusted clock signal j come earlier than adjusted data "B", "D", "F" etc., and adjusted data "Z", "B", "D", "F" etc. are received at up edges. Similarly, up edges of the clocked signal j come earlier than adjusted data "A", "C", "E", "G", etc., and adjusted data "A", "C", "E", etc. are received at down edges. Accordingly, the adjusted reception data j [1:0] does not correspond to the reception data j [1:0]. Thus, the data comparison result is NG.

As described by (1) through (4), by comparing the adjusted reception data j [1:0] and the reception data j [1:0] while changing phases of the data signals by using the data adjustment circuit 1031-j, the data comparison results (OK or NG) are determined for each phase. The center value of the range of the TAP2 values whose data comparison result is OK corresponds to the optimum delay amount, and thus the optimum TAP update difference j can be obtained by calculating the average value between the upper and lower limit values of the TAP2 value.

For example, when the upper limit value and the lower limit value of the TAP2 value are +5 and −3, respectively, the TAP update difference j is 1 (((+5)+(−3))/2=+1). Accordingly, the clock adjustment control circuit 1023-j subtracts 1 from the current TAP value 5 so as to set the TAP value to 4, and thereby the phase adjustment is completed. Thereby, the phase of the adjusted clock signal j is advanced by the amount that corresponds to the TAP value 1, and the waveform of the adjusted clock signal j is as denoted by (5).

As has been described above, by providing a continuous adjustment unit to each data path, it is made possible to perform a phase adjustment without using training patterns. As a result of this, it is made unnecessary to halt transmission of normal data during the system operation, and thus deterioration in data transmission performance can be avoided. Also, a continuous phase adjustment is made possible, and thus it is possible for edges of a clock signal to follow the centers of the data waveform so that stable data transmission is made possible even when relationships in phase between clock signals and data signals change greatly.

Adjustment pattern "10" and termination pattern "11" illustrated in FIGS. 3 and 4, the TAP2 value j and the outputs by the decoder illustrated in FIG. 16, and the TAP value j and the outputs by the decoder illustrated in FIG. 6 are just examples, and other patterns or values can be used.

What is claimed is:

1. An information processing apparatus including a data transmission device, and a data reception device that is connected to the data transmission device and that receives data output from the data transmission device, wherein:
   the data transmission device comprises:
      a reference clock generation unit to generate a reference clock;
      a selection circuit to input transmission target data and phase adjustment data, and to select one of the transmission target data and the phase adjustment data; and
      a transmission data synchronization output circuit to output the data selected by the selection circuit as transmission data in synchronization with the reference clock; and
   the data reception device comprises:
      a clock phase adjustment circuit to input the reference clock, and to output a delayed clock obtained by delaying a phase of the reference clock on the basis of a clock phase adjustment value;
      a reception data output unit to input the transmission data, and to output the input transmission data as reception data in synchronization with the delayed clock;
      a data adjustment circuit to input the transmission data, and to output adjustment target reception data obtained by delaying the transmission data on the basis of a data phase adjustment value;
      an adjustment reception data output unit to input the adjustment target reception data, and to output the input adjustment target reception data as adjustment reception data in synchronization with the delayed clock; and
      a comparison unit to input the reception data and the adjustment reception data, to compare the reception data and the adjustment reception data, and to output the data phase adjustment value on the basis of a result of comparison indicating whether the reception data corresponds to the adjustment reception data.

2. The information processing apparatus according to claim 1, wherein:
   the information processing apparatus further comprises a system control device connected to the transmission device and the reception device;
   the clock phase adjustment circuit selects the clock phase adjustment value in accordance with an instruction from the system control device; and
   the data adjustment circuit selects the data phase adjustment value in accordance with an instruction from the system control device.

3. The information processing apparatus according to claim 1, wherein:
   the comparison unit outputs update information of the clock phase adjustment value on the basis of the result of the comparison, and the clock phase adjustment circuit updates the clock phase adjustment value on the basis of the update information.

4. A data reception device that is connected to a data transmission device and that receives data output from the data transmission device, the data reception device comprising:
   a clock phase adjustment circuit to input a reference clock, and to output a delayed clock obtained by delaying a phase of the reference clock on the basis of a clock phase adjustment value;
   a reception data output unit to input transmission data output from the data transmission device, and to output the input transmission data as reception data in synchronization with the delayed clock;
   a data adjustment circuit to input the transmission data, and to output adjustment target reception data obtained by delaying the transmission data on the basis of a data phase adjustment value;
   an adjustment reception data output unit to input the adjustment target reception data, and to output the input adjustment target reception data as adjustment reception data in synchronization with the delayed clock; and
   a comparison unit to input the reception data and the adjustment reception data, to compare the reception data and the adjustment reception data, and to output the data phase adjustment value on the basis of a result of comparison indicating whether the reception data corresponds to the adjustment reception data.

5. The data reception device according to claim 4, wherein:
   the data reception device is connected to a system control device; the clock phase adjustment circuit selects the clock phase adjustment value in accordance with an instruction from the system control device; and
   the data adjustment circuit selects the data phase adjustment value in accordance with an instruction from the system control device.

6. The data reception device according to claim 4, wherein:
   the comparison unit outputs update information of the clock phase adjustment value on the basis of the result of the comparison, and the clock phase adjustment circuit updates the clock phase adjustment value on the basis of the update information.

7. A method of controlling an information processing apparatus including a data transmission device, and a data reception device that is connected to the data transmission device and that receives data output from the data transmission device, the method comprising:
   generating a reference clock;
   selecting one of transmission target data and phase adjustment data;
   outputting the selected data as transmission data in synchronization with the reference clock from the data transmission device to the data reception device;
   generating a delayed clock by delaying a phase of the reference clock on the basis of a clock phase adjustment value;
   outputting the transmission data as reception data in synchronization with the delayed clock;
   generating adjustment target reception data by delaying the transmission data on the basis of a data phase adjustment value;
   outputting the adjustment target reception data as adjustment reception data in synchronization with the delayed clock; and
   comparing the reception data and the adjustment reception data, and of generating the data phase adjustment value on the basis of a result of comparison indicating whether the reception data corresponds to the adjustment reception data.

8. The controlling method according to claim 7, wherein:
the information processing apparatus further comprises a system control device connected to the transmission device and the reception device; and
the controlling method further comprises:
- selecting the clock phase adjustment value in accordance with an instruction from the system control device; and
- selecting the data phase adjustment value in accordance with an instruction from the system control device.

9. The controlling method according to claim 7, further comprising:
updating the clock phase adjustment value on the basis of the result of the comparison.

\* \* \* \* \*

UNITED STATES PATENT AND TRADEMARK OFFICE
CERTIFICATE OF CORRECTION

PATENT NO. : 8,516,291 B2  
APPLICATION NO. : 12/955473  
DATED : August 20, 2013  
INVENTOR(S) : Hiroshi Nakayama et al.

Page 1 of 1

It is certified that error appears in the above-identified patent and that said Letters Patent is hereby corrected as shown below:

On the Title Page, Col. 1, After Prior Publication Data insert
-- Related U.S. Application Data
(63)  Continuation of application No. PCT/JP2008/001405, filed on Jun. 3, 2008. --.

Signed and Sealed this
Tenth Day of December, 2013

Margaret A. Focarino
*Commissioner for Patents of the United States Patent and Trademark Office*